US011019180B2

(12) United States Patent
Zhang et al.

(10) Patent No.: US 11,019,180 B2
(45) Date of Patent: *May 25, 2021

(54) GOODS ORDER PROCESSING METHOD AND APPARATUS, SERVER, SHOPPING TERMINAL, AND SYSTEM

(71) Applicant: Advanced New Technologies Co., Ltd., Grand Cayman (KY)

(72) Inventors: Hong Zhang, Hangzhou (CN); Xiaodong Zeng, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/945,650

(22) Filed: Jul. 31, 2020

(65) Prior Publication Data
US 2020/0366762 A1    Nov. 19, 2020

Related U.S. Application Data

(63) Continuation of application No. 16/692,316, filed on Nov. 22, 2019, now Pat. No. 10,791,199, which is a (Continued)

(30) Foreign Application Priority Data

Sep. 25, 2017    (CN) .......................... 201710873473.6

(51) Int. Cl.
*G06F 15/16* (2006.01)
*H04L 29/06* (2006.01)
(Continued)

(52) U.S. Cl.
CPC .............. *H04L 67/42* (2013.01); *G10L 15/30* (2013.01); *H04L 29/06047* (2013.01);
(Continued)

(58) Field of Classification Search
None
See application file for complete search history.

(56) References Cited

U.S. PATENT DOCUMENTS 9,262,681 B1* 2/2016 Mishra ............... G06K 9/00771
2014/0168477 A1* 6/2014 David ................ G06Q 30/0639
348/240.2

(Continued)

FOREIGN PATENT DOCUMENTS

CN    104112216    10/2014
CN    104778618    7/2015
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Phuoc H Nguyen
(74) *Attorney, Agent, or Firm* — Fish & Richardson P.C.

(57) ABSTRACT

At least one associated image uploaded by a client is received, where the at least one associated image is obtained in response to detecting, by the client based on an image recognition method, an occurrence of a change of goods in a storage container. Based on the at least one image, difference information pertaining to a difference in the goods in the storage container is identified. Corresponding goods order change information is generated using the difference information. User order information corresponding to the client based on the goods order change information is updated. Updated user order information is sent to the client.

20 Claims, 23 Drawing Sheets

Related U.S. Application Data continuation of application No. PCT/CN2018/107028, filed on Sep. 21, 2018.

(51) Int. Cl.
*G10L 15/30* (2013.01)
*H04L 29/08* (2006.01)

(52) U.S. Cl.
CPC ........ *H04L 29/08072* (2013.01); *H04L 67/02* (2013.01); *H04L 67/10* (2013.01)

(56) References Cited

U.S. PATENT DOCUMENTS

| | | | |
|---|---|---|---|
| 2015/0012396 A1 | 1/2015 | Puerini et al. | |
| 2015/0019391 A1 | 1/2015 | Kumar et al. | |
| 2015/0029339 A1* | 1/2015 | Kobres | H04N 7/181 348/150 |
| 2015/0039458 A1 | 2/2015 | Reid | |
| 2015/0095189 A1* | 4/2015 | Dharssi | G07G 1/0081 705/26.8 |
| 2017/0337539 A1* | 11/2017 | Richards | G06K 9/6202 |
| 2018/0039841 A1* | 2/2018 | Richards | G06K 9/00771 |
| 2019/0172039 A1* | 6/2019 | Kambara | G06Q 20/201 |
| 2019/0279185 A1 | 9/2019 | Cheng | |

FOREIGN PATENT DOCUMENTS

| | | |
|---|---|---|
| CN | 104787102 | 7/2015 |
| CN | 204614025 | 9/2015 |
| CN | 106204226 | 12/2016 |
| CN | 106709422 | 5/2017 |
| CN | 106781121 | 5/2017 |
| CN | 106934692 | 7/2017 |
| CN | 107833083 | 3/2018 |

OTHER PUBLICATIONS

Extended European Search Report in European Application No. 18857658.1, dated Mar. 6, 2020, 10 pages.
International Search Report and Written Opinion in International Application No. PCT/CN2018/0107028 dated Dec. 21, 2018; 9 pages.
Nakamoto, "Bitcoin: A Peer-to-Peer Electronic Cash System," www.bitcoin.org, 2005, 9 pages.
PCT International Preliminary Report on Patentability in International Application No. PCT/CN2018/107028, dated Mar. 31, 2020, 9 pages (with English translation).
Weise, usatoday.com [online], "How Amazon's line-less grocery service might really work," Dec. 8, 2016, retrieved on Mar. 11, 2020, retrieved from URL<https://www.usatoday.com/story/tech/news/2016/12/06/amazon-go-surveillance-cameras-shopping-grocery-supermarket/95055200/>, 5 pages.

* cited by examiner

Real-time uploading of a video image

Real-time uploading of a video image

Real-time uploading of a video image

Real-time uploading of a video image

Real-time uploading of a video image

Real-time uploading of a video image

GOODS ORDER PROCESSING METHOD AND APPARATUS, SERVER, SHOPPING TERMINAL, AND SYSTEM

CROSS-REFERENCE TO RELATED APPLICATIONS

This application is a continuation of U.S. application Ser. No. 16/692,316, filed on Nov. 22, 2019, which is a continuation of PCT Application No. PCT/CN2018/107028, filed on Sep. 21, 2018, which claims priority to Chinese Patent Application No. 201710873473.6, filed on Sep. 25, 2017, and each application is hereby incorporated by reference in its entirety.

TECHNICAL FIELD

Implementations of the present specification belong to the field of computer data processing technologies, and in particular, relate to a goods order processing method, apparatus, and system, a server, and a shopping terminal.

BACKGROUND

Fast development of computer and Internet technologies has boosted rapid rising of many emerging industries, and changed ways of shopping and provided convenience for many consumers. A self-service supermarket is a current market expansion hotspot that major shopping platform operators are focusing on, and involve technical issues about how to conveniently and reliably process order data of users.

At present, self-service supermarkets can adopt a self-service order settlement solution, A plurality of sensor devices such as cameras, pressure sensors, infrared sensors, and wireless network devices are deployed in places like shelves and aisles in the malls to monitor commodities taken out by customers from the shelves and complete order settlement in combination with devices used for self-service QR code-based scanning payment, shopping cart-based weighing, and so on. Such a method needs a plurality of types of auxiliary devices, and a large number of apparatuses need to be deployed in the malls, resulting in relatively high hardware costs for service implementation. Moreover, the method needs data collaboration of the sensor devices to collect statistics of the commodities, and it is hard to ensure stability, which is not conducive to large-scale promotion and application. Therefore, currently, a simple, convenient, and reliable order processing solution with lower costs is needed for self-service supermarkets.

SUMMARY

Implementations of the present specification aim to provide a goods order processing method, apparatus, and system, a server, and a shopping terminal, so that a convenient, simple, and reliable order settlement method with lower implementation costs can be provided to reduce implementation costs of a self-service supermarket automatic order processing solution and improve order data processing reliability.

The goods order processing method, apparatus, and system, the server, and the shopping terminal provided in the implementations of the present specification are implemented in the following ways:

A goods order processing method is provided, where the method includes the following: detecting, by a client based on an image recognition method, whether a change occurs to goods in a storage container; if a change of the goods is detected, sending, by the client, an associated image of the change of the goods in the storage container to a server; identifying, by the server, information about the goods difference in the storage container based on the associated image; generating, by the server, corresponding goods order change information by using the difference information; updating, by the server, user order information corresponding to the client based on the goods order change information; sending, by the server, updated user order information to the client; and displaying, by the client, the updated user order information.

A goods order processing method is provided, where the method includes the following: receiving an associated image uploaded by a client, where the associated image includes an image obtained when the client detects, based on an image recognition method, that a change of the goods occurs to goods in a storage container; identifying information about the goods difference in the storage container based on the associated image; generating corresponding goods order change information by using the difference information; updating user order information corresponding to the client based on the goods order change information; and sending updated user order information to the client.

A goods order processing method is provided, where the method includes the following: detecting, based on an image recognition method, whether a change of the goods occurs in a storage container; if a change of the goods is detected, sending an associated image of the change of the goods in the storage container to a server; receiving updated user order information returned by the server; and displaying the updated user order information.

A goods order processing apparatus is provided, where the apparatus includes the following: an image receiving module, configured to receive an associated image uploaded by a client, where the associated image includes an image obtained when the client detects, based on an image recognition method, that a change of the goods occurs in a storage container; an image recognition module, configured to identify information about the goods difference in the storage container based on the associated image; an order generation module, configured to generate corresponding goods order change information by using the difference information; an order update module, configured to update user order information corresponding to the client based on the goods order change information; and an information feedback module, configured to send updated user order information to the client.

A goods order processing apparatus is provided, where the apparatus includes the following: a change of goods detection module, configured to detect, based on an image recognition method, whether a change of the goods occurs in a storage container; an image sending module, configured to send an associated image of the change of the goods in the storage container to a server if a change is detected; an information receiving module, configured to receive updated user order information returned by the server; and a display module, configured to display the updated user order information.

A server is provided, including at least one processor and a memory configured to store an instruction executable by the processor, where when executing the instruction, the processor implements the following: receiving an associated image uploaded by a client, where the associated image includes an image obtained when the client detects, based on an image recognition method, that a change of the goods occurs in a storage container; identifying information about the goods difference in the storage container based on the associated image; generating corresponding goods order change information by using the difference information; updating user order information corresponding to the client based on the goods order change information; and sending updated user order information to the client.

A shopping terminal is provided, including at least one processor and a memory configured to store an instruction executable by the processor, where when executing the instruction, the processor implements the following: detecting, based on an image recognition method, whether a change of the goods occurs in a storage container; if a change of the goods is detected, sending an associated image of the change of the goods in the storage container to a server; receiving updated user order information returned by the server; and displaying the updated user order information.

A goods order processing system is provided, including a shopping terminal and a server, where the server includes any apparatus in the implementations of the present specification; and the shopping terminal includes any shopping terminal in the implementations of the present specification; or the server implements steps of any method in the implementations of the present specification; and the shopping terminal implements steps of any method in the implementations of the present specification.

According to the goods order processing method, apparatus, and system, the server, and the shopping terminal that are provided in one or more implementations of the present specification, a photographing device can be installed in a shopping basket, a shopping cart, or other storage containers, and a remote server can identify and determine a user order change by monitoring a change of the goods in the storage container in real time, and can generate or update a shopping list of a user. As such, end-user devices such as an intelligent shopping cart can be used to process data of self-service supermarket orders in combination with a server for goods identification and order processing to reduce self-service cashier devices, sensor devices, etc. With the implementation solutions provided in the present specification, an image capture device or a video shooting device of a client can be used to send image data of goods detection to a server, so that the server performs processes such as goods identification and order settlement. Therefore, overall hardware implementation costs can be lower. In addition, data exchanging nodes can be reduced and solution implementations can be simpler and more convenient. In actual applications, implementation costs of the technical solutions for automatic settlement processing of self-service supermarket goods orders can be greatly reduced, and the technical solutions are convenient to implement and have better stability. An implementation environment and implementation factors such as self-service supermarket size, customer flow volume, and consumer behavior feature have relatively small impact, and facilitate large-scale promotion and use.

BRIEF DESCRIPTION OF DRAWINGS

To describe the technical solutions in the implementations of the present specification or in the existing technology more clearly, the following briefly introduces the accompanying drawings for describing the implementations or the existing technology. Apparently, the accompanying drawings in the following description merely show some implementations of the present specification, and a person of ordinary skill in the art can still derive other drawings from these accompanying drawings without creative efforts.

DESCRIPTION OF IMPLEMENTATIONS

Figure 1:
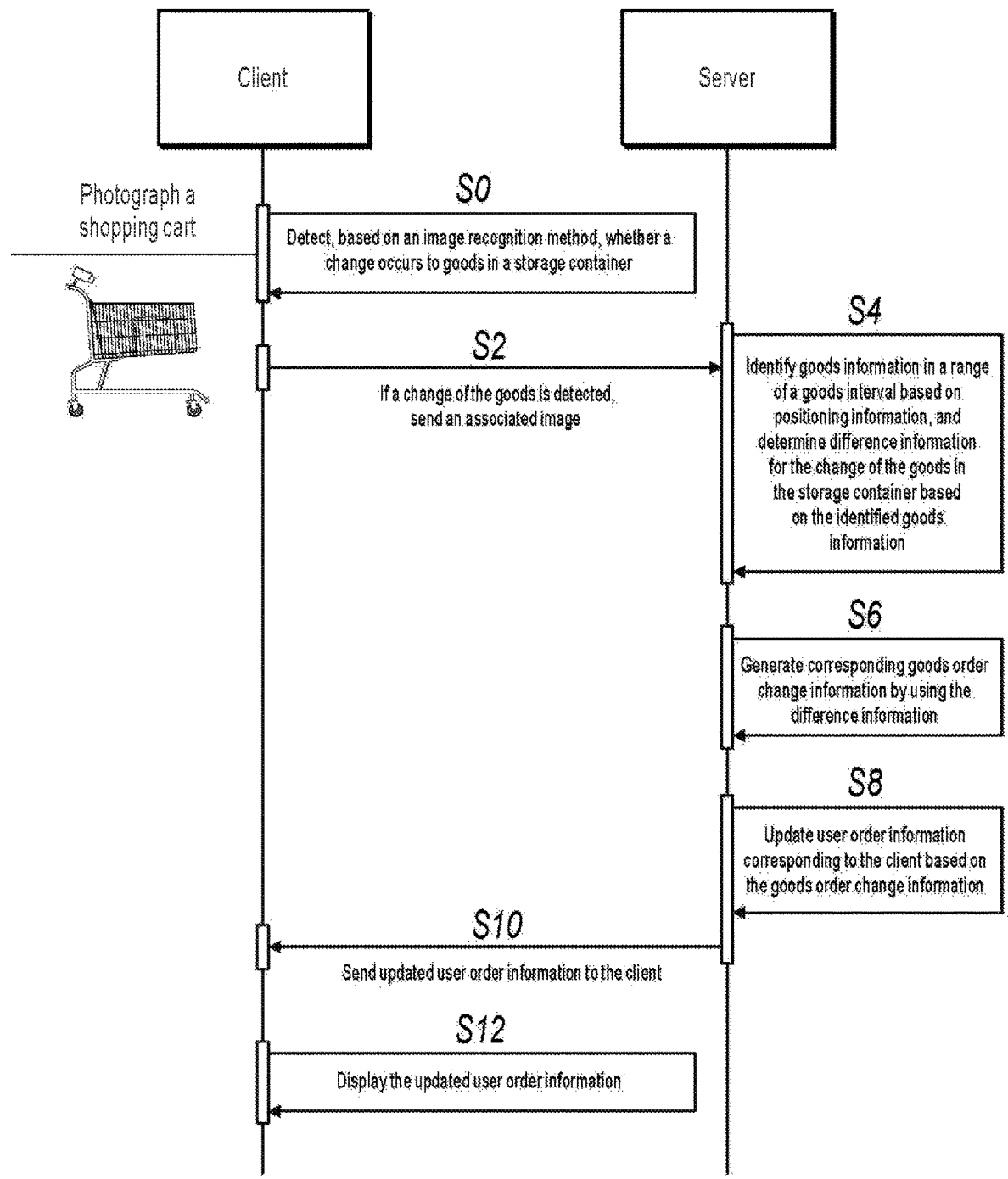
FIG. 1 is a schematic flowchart illustrating an implementation of a goods order processing method, according to an implementation of the present specification.

To make a person skilled in the art understand the technical solutions in the present specification better, the following clearly describes the technical solutions in one or more implementations of the present specification with reference to the accompanying drawings in the one or more implementations of the present specification. Apparently, the described implementations are merely some but not all of the implementations of the present specification. All other implementations obtained by a person of ordinary skill in the art based on the one or more implementations of the present specification without creative efforts shall fall within the protection scope of the solutions in the implementations of the present specification.

Implementation solutions provided in the present specification can be applied to, but not limited to, application scenarios of self-service supermarkets, and can adopt a Client/Server (C/S) system architecture. Generally, devices having a photographing or video recording function, such as smartphones, video cameras, monitors, and digital cameras, can be installed in a plurality of types of goods loading devices (which can be collectively referred to as storage containers in some implementations of the present specification for ease of universal description), such as handheld shopping baskets, hand-pulled shopping baskets, shopping carts, and platform trucks that are provided in self-service supermarkets. These photographing or video recording devices can contain image change detection logic, and can detect change of the goods status in a storage container based on a captured image or a video image. A client can send an image of a change of the goods to a server side for processing. The server side can identify, based on the image, a goods that is added by a user to the storage container or a goods that is taken out by the user from the storage container, and generate corresponding change of the goods information. Further, total order information of the user can be generated or updated based on the information about the change of the goods in the storage container. The updated total order information of commodities can be immediately displayed on a client display device for the user to view, confirm, etc.

Notably, the C/S can be a logically divided client/server architecture. To be specific, in some implementations of the present specification, the client can include an end-user device that collects a goods image of the storage container, and the server can include an end-user device that obtains the image collected by the client and performs goods identification and order processing based on the image. In some implementation products, the implementation solutions of the present specification can also be applied to an implementation scenario that the client and the server are the same physical device. For example, a device on a smart shopping cart can include an image change detection module, and can also include an in-image-goods identification module and/or an order data processing module. Each smart shopping cart can perform self-service change of the goods detection, goods identification, order processing, etc. Order data of all smart shopping carts can be summarized to a specified order service server.

The following describes in detail one or more implementation solutions of the present specification by using an application scenario that order processing is performed on commodities in a user's shopping cart in a self-service supermarket. Notably, the implementation solutions of the present specification are not limited to implementation applications in a self-service supermarket scenario. The implementation solutions provided in the implementations of the present specification can also be applied to other implementation scenarios, for example, an implementation scenario that a change of the goods in a storage container is identified in a platform truck, a container, a truck compartment, an express packing box, and so on and corresponding goods order data is processed. The self-service supermarket in the implementations can include no or a few on-site cashiers that introduce commodities in normal shopping carts. The supermarket can include a convenience store, a large shopping mall, a self-service station, etc. A user can collect purchased commodities by using a shopping cart in the supermarket, a photographing or video shooting device on the shopping cart can detect a change of the goods in the shopping cart, and subsequently a server can identify a goods and generate a corresponding order. After the user completes a purchase, the user's shopping list can be generated automatically, more rapidly, more reliably, and more stably. The user can voluntarily perform order settlement, for example, perform online settlement on a payment platform. After the order settlement succeeds, the user can pass exit or aisle without lining up, As such, user shopping experience can be greatly improved.

FIG. 1 is a schematic flowchart illustrating an implementation of a goods order processing method, according to one implementation of the present specification. Although the present specification provides method operation steps or apparatus structures shown in the following implementations or the accompanying drawings, the method or apparatus can include more or fewer (after partially combined) operation steps or module units based on conventional or non-creative efforts. In a step or structure that a necessary cause and effect relationship does not logically exist, sequence of executing these steps or a module structure of the apparatus is not limited to execution sequence or a module structure shown in the implementations or the accompanying drawings of the present specification. In an actual apparatus, server, or end-user device product application, the method or the module structure can be performed sequentially or in parallel based on method or module structure shown in the implementations or the accompanying drawings (for example, in a parallel processor or a multi-threaded processing environment, or even an implementation environment including distributed processing and server clustering). A specific implementation is shown in FIG. 1. In an implementation of a goods order processing method provided in the present specification, the method can include the following steps.

S0: A client detects, based on an image recognition method, whether a change of the goods occurs in a storage container.

In the present implementation, the client can include an electronic device that is installed on a shopping cart and has an image change detection function, such as a smartphone, a video camera, or a monitor. The client can further have a communication capability, and can send a captured image or a shot video to a server. In an implementation method, the client can be independent apparatuses such as an end-user device installed on the storage container for image capture and an end-user device for image change detection. For example, the client can include a smartphone for photographing and video uploading and a dedicated device for image change detection. In other implementation methods, the client can alternatively include one end-user device that is composed of a plurality of devices such as an image capture apparatus, an image change detection apparatus, and a communication module, or can even be combined with a storage container such as a shopping cart to form a whole of the client. The storage container can include a plurality of types of storage apparatuses used for storing commodities purchased by users, for example, a handheld shopping basket and a hand-pushed shopping cart.

Figure 2:
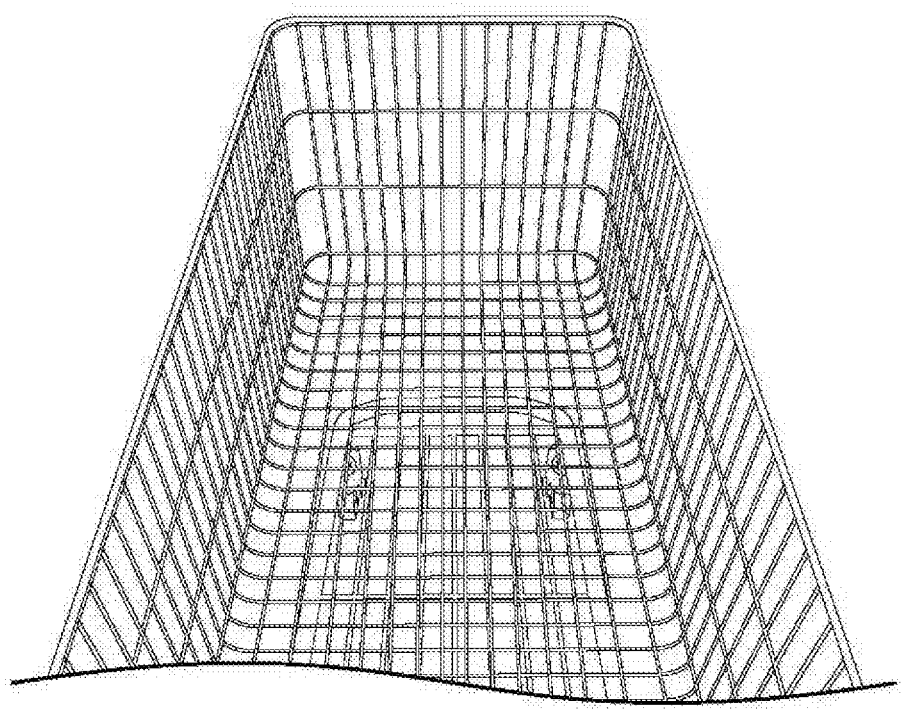
FIG. 2 is a schematic diagram illustrating an implementation scenario of photographing a goods in a shopping cart by a client, according to one implementation of the present specification.

In a specific example of the present implementation scenario, FIG. 2 is a schematic diagram illustrating an implementation scenario of photographing a goods in a shopping cart by a client, according to one implementation of the present specification. The storage container can be a shopping cart used in a supermarket, for example, common shopping carts with various containers of 60 liters, 80 liters, 100 liters, etc. In the present example, a smartphone can be used as the client, and the smartphone can include a high-definition camera and a screen. A smartphone holder can be disposed near a user handrail or a holding part of the shopping cart, and can be used to place smartphones of a plurality of sizes and types. The smartphone can be placed in the holder, so that the camera of the smartphone faces towards the shopping cart and can photograph the shopping cart. The screen of the smartphone faces towards the user, and the screen can display generated user order information (commodities placed in the shopping cart by the user) or display a shopping prompt, an error, navigation information, and other information.

It can be considered that the user places commodities into the shopping cart one by one during shopping. When the user determines to use a certain shopping cart, it can be considered that a client (a smartphone) on the shopping cart is bound to the user. For example, if the user unlocks shopping cart A through scanning, shopping cart A is bound one to one with an ID of the user after verification succeeds. In such a case, the smartphone on the shopping cart can run a photographing application. The smartphone can include an image change detection module, for example, an image change detection algorithm or a computing model that is set in the photographing application, and can capture different images or record a video containing the different images before and after an image change moment. In an implementation method, the smartphone can photograph the shopping cart at a predetermined frequency or keep photographing the shopping cart after enabling the photographing application. In addition, the smartphone can detect a captured image, and can determine, by using an image recognition method, whether a change of the goods occurs in the shopping cart, for example, the user puts in a new goods or takes out a goods. The image recognition method can include obtaining a direct different part of the image and determining an image change by identifying the different part. In specific implementation, if an image difference absolute value in a specified area exceeds a specific threshold, updated image frames can be sent to the server at a specific time interval based on an adjacent-frame subtraction method. If an image remains unchanged, it can be considered that no change occurs to the goods and no image needs to be sent.

Therefore, in an implementation of the method provided in the present specification, the detecting, based on an image recognition method, whether a change of the goods occurs in a storage container can include the following.

S02: Capture goods images of the storage container by using a photographing device.

S04: Detect difference data between the goods images based on a chronological sequence.

S06: If the difference data is greater than a predetermined change threshold, determine that a change of the goods occurs in the storage container.

Figure 3:
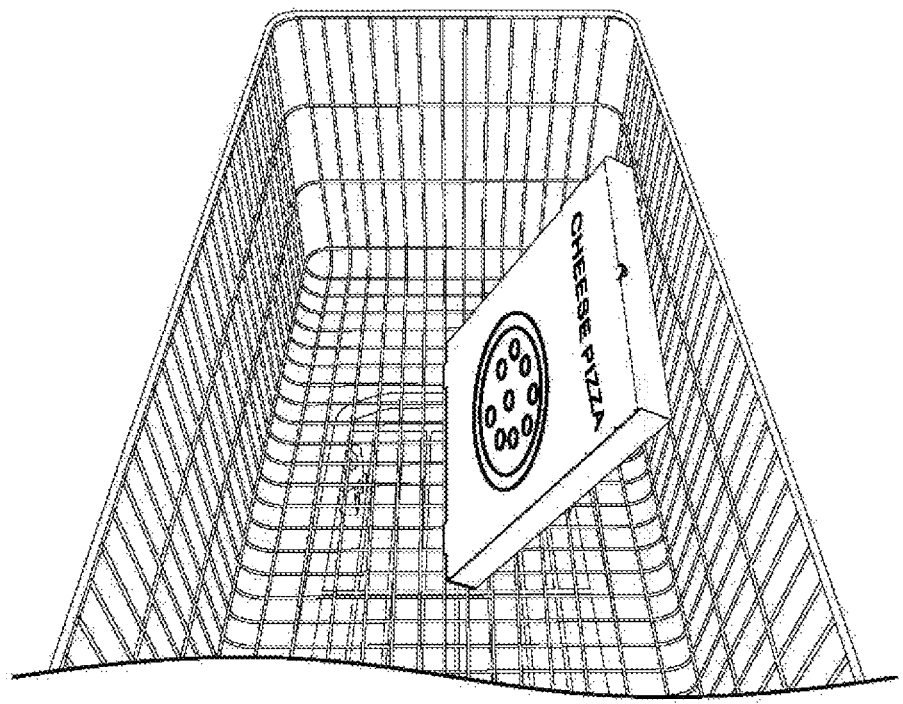
FIG. 3 is a schematic diagram illustrating an implementation scenario of photographing an added goods in a shopping cart by a client, according to one implementation of the present specification.

The photographing device can include the previously described camera, and can also include a digital camera, a video camera, a monitor, etc. After obtaining the goods images of the storage container, the goods images can be detected based on a chronological sequence of frames, to determine whether a change of the goods occurs in the goods storage container. Generally, when a new goods is placed into or a goods is taken out from the storage container such as a shopping cart, an image of the storage container captured by the photographing device changes. FIG. 3 is a schematic diagram illustrating an implementation scenario of photographing an added goods in a shopping cart by a client, according to one implementation of the present specification. The client can detect the image change, and can obtain the difference data for the image change. In the present implementation, if the difference data for the image change is greater than the predetermined change threshold, it can be determined that a change of the goods occurs in the storage container. As such, image change interference information not caused by putting in or taking out some commodities can be alleviated, for example, a small shift of a goods in the shopping cart caused by shaking of the shopping cart. Certainly, a specific change threshold value range for determining the difference data can be set based on experience or experiments. In the schematic diagrams respectively illustrating an empty shopping cart and a shopping cart with one goods in FIG. 2 and FIG. 3, for ease of image detection, shelters can be placed around or at the bottom of the shopping cart. As such, when a goods is put in an area captured by the photographing device, the captured goods image changes obviously, and interference information outside the captured shopping cart such as aisles, shelves, and silhouettes can be reduced.

Notably, the client photographs a goods in the storage container, including image data captured at a predetermined frequency, or including goods image data of a recorded video. In one or more implementations of the present specification, the video can be considered as a set of continuous images or one type of image data. Therefore, the image data such as the goods image and an associated image in the present specification can include a separately captured image, and can also include an image in a video.

S2: If a change of the goods is detected, the client sends an associated image of the change of the goods in the storage container to a server.

If the client detects a change of the goods in the storage container, for example, a new goods is put in the storage container, the client can detect that the captured image has changed. When determining, based on the captured goods image, that a change of the goods occurs in the shopping cart, the client can obtain the associated image of the change of the goods in the shopping cart, and can send the associated image to a predetermined server for processing, for example, a cloud server used for supermarket order processing.

The associated image can include the image that is sent by the client to the server for detecting and identifying a change of the goods, and can be a single image or a plurality of images. In an implementation method, the associated image can include a separate discontinuous image captured by the client side, or can include video data that is recorded by the client and detects a change of the goods. In such a case, the video data can be considered as a continuous associated image. During associated image determining, once the client determines that a change of the goods occurs in the storage container, different images or a video detected before and after the image change moment can be used as the associated image. Certainly, in other implementation methods, images in a period of time (for example, 3 seconds) before and after the image change moment can also be used as the associated image. In one or more implementations provided in the present specification, the associated image can include at least one of the following: S20: a goods image corresponding to difference data that is greater than the change threshold; S22: a goods image in a goods image predetermined window range corresponding to a change of the goods moment if it is determined that a change of the goods occurs in the storage container; and S24: a goods image in a goods image predetermined time range corresponding to a change of the goods moment if it is determined that a change of the goods occurs in the storage container.

In a specific application scenario, for example, when it is detected that difference data data0 between goods images at moment T0 and moment T1 is greater than the predetermined change threshold, goods images P0 and P1 at moment T0 and moment T1 corresponding to the difference data data0 can be used as the currently detected associated images for the change of the goods in the storage container. Or, when a change of the goods is detected at moment T2, goods image P2 corresponding to moment T2 and 10 goods images before and after P2 (in such a case, a window size is 11 images) are selected as the associated images to be sent to the server. Or, image data recorded in a video shot in 3 seconds before and after image change moment T3 is selected as the associated image. In the implementations provided in the present specification, a method for determining the associated image can include one or a combination of the previously described methods. For example, the goods image corresponding to the difference data and 10 images (an overlapped image does not need to be selected) before and after a change moment can be jointly selected as the associated images.

Figure 4:
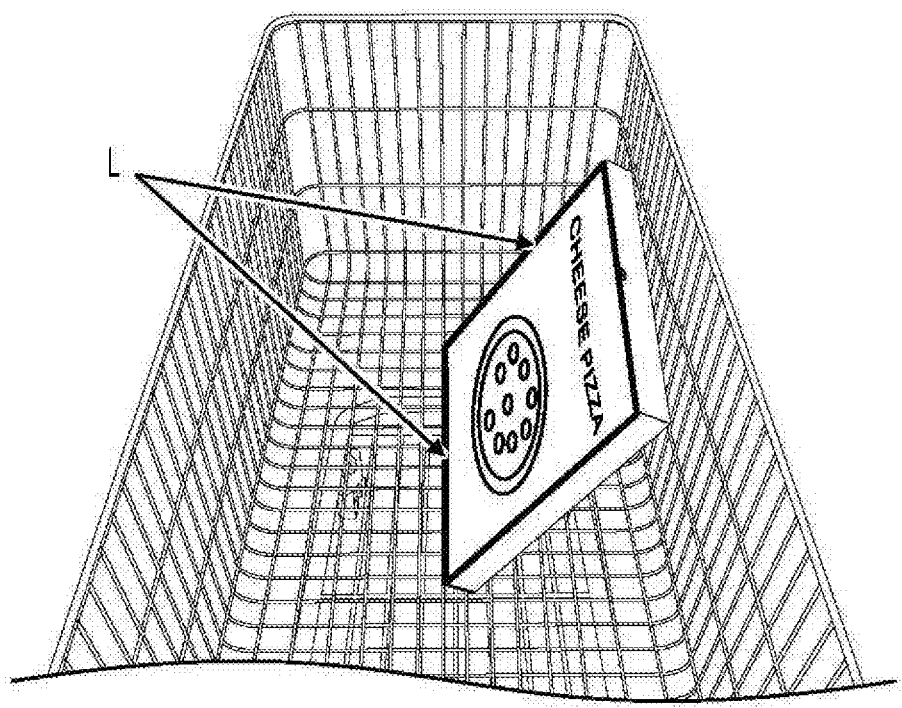
FIG. 4 is a schematic diagram illustrating identification of goods boundaries for a change of the goods, according to one implementation of the present specification.

In the application scenario in the present implementation, during processing of detecting whether a goods image is changed, whether a change of the goods occurs in the shopping cart can be determined by using difference data obtained through image subtraction. FIG. 4 is a schematic diagram illustrating identification of goods boundaries for a change of the goods, according to one implementation of the present specification. L is identified boundary frames of a pizza packing box. Image boundaries of a goods newly added to the shopping cart as shown by L in FIG. 4 can be identified through image subtraction and connected component analysis with thresholding. In another implementation of the method provided in the present specification, the client can detect goods boundaries in an image that has a change of the goods, and then upload an associated image to the server for goods identification, order processing, etc. for the image. The client can upload an image within the identified goods boundaries to reduce image data transmission, network traffic, and server load. Therefore, in another implementation of the method in the present application, the method can further include the following step:

S3: The client identifies goods boundaries for a change of the goods in the associated image after obtaining the associated image.

Correspondingly, the client sends the associated image to the server, including sending an image within the identified goods boundaries to the server.

Figure 5:
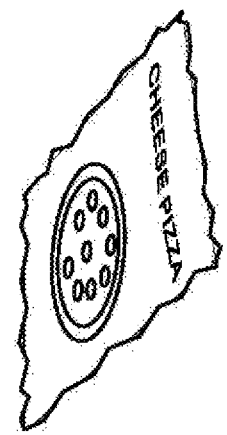
FIG. 5 shows an image within identified goods boundaries in an implementation scenario, according to one implementation of the present specification.

In a specific example, after determining the goods boundaries shown in FIG. 4, a goods image shown in FIG. 5 that is within the goods boundaries in FIG. 4 is uploaded to the server. FIG. 5 shows an image within identified goods boundaries in an implementation scenario, according to one implementation of the present specification. It can be seen from FIG. 4 and FIG. 5 that, by uploading image information within the goods boundaries identified by the client in the present implementation, network traffic can be effective reduced, retransmitted redundant information can be reduced, image data processing load of the server can be reduced, and image recognition processing efficiency can be improved, etc.

Figure 6:
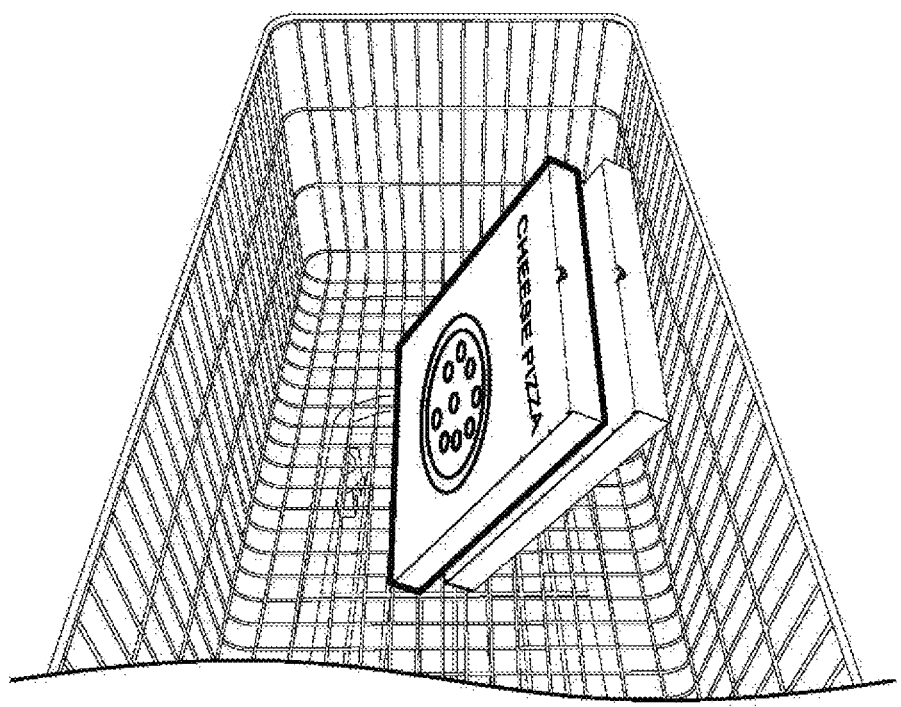
FIG. 6 is a schematic diagram illustrating a scenario that another goods is stacked on the first goods in the shopping cart shown in FIG. 3.
Figure 7:
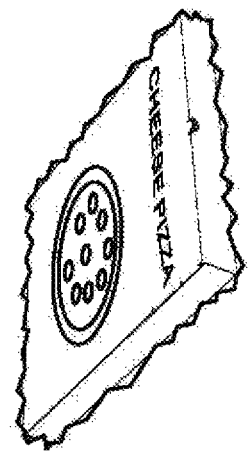
FIG. 7 shows an image within goods boundaries, of the new goods in FIG. 6, identified based on an image difference.

Certainly, other goods boundary identification algorithms can alternatively be used, including the following case: A goods image for a change of the goods can still be identified when commodities are stacked. For example, FIG. 6 is a schematic diagram illustrating a scenario that another goods is stacked on the first goods in the shopping cart shown in FIG. 3, and FIG. 7 shows an image within goods boundaries, of the new goods in FIG. 6, identified based on an image difference.

The client sends the associated image to the server. The client can send the obtained associated image to the server through near field communication such as WiFi or a local area network of a mobile phone or network communication connections such as an operator's communications network and a dedicated cable. The server can store the associated image uploaded by the client. In an implementation method, the client can directly send the associated image to the server, for example, through an operator's communications network. In other implementation methods, a universal interface device for a plurality of clients can be set, so that a plurality of clients in a supermarket can send, through near field communication, the associated image to the universal interface device, for example, a supermarket hosting server, and then the supermarket hosting server can send the associated image to the server used for identifying a goods in the image.

S4: The server identifies information about the goods difference in the storage container based on the associated image.

After obtaining the associated image uploaded by the client, the server can analyze and process the associated image, for example, perform associated image comparison based on a chronological sequence to determine a difference, and identify information about a goods that is added or removed in the associated image. An image processed by the server can include an image captured by the client or data of a video-type goods image, or can include image data within goods boundaries identified by the client based on the image difference.

After analyzing and processing the associated image, the server can obtain the goods difference information for the change of the goods in the storage container. The goods difference information can include image data, and can also include identification information that shows a change occurs in the goods in the storage container. For example, as shown in FIG. 3 and FIG. 4, it can be identified that a new goods is put in the shopping cart, and it can be determined through image recognition that the goods is G01, with a goods identification code of good_001. In such a case, it can be determined that the information about the goods difference in the storage container can be ADD:good_001, where ADD can indicate the following: The present change of the goods is that a goods is added. Therefore, in another implementation of the method provided in the present specification, the server identifies the information about the goods difference in the storage container based on the associated image, including:

S40: Detect a goods identifier in the associated image, to use the detected goods identifier as the goods difference information.

In a specific example, for example, the server can be set with a barcode detection and identification module to identify a barcode in the associated image, where the barcode can include a plurality of goods attributes, for example, a goods name and a goods price. When a change of the goods occurs in the shopping cart, the barcode detection and identification module detects and identifies an input associated image, and searches for a regular barcode. If the identification succeeds, the goods difference information can be determined.

Certainly, other implementation methods for detecting and identifying a goods in an associated image can further be set on the server side. In another implementation of the method provided in the present specification, a machine learning algorithm can be used to detect a goods in an associated image. Any of the following implementation methods can be used:

S42: After obtaining the associated image, detect goods information in the associated image by using a goods detection model obtained through a machine learning algorithm, to determine the goods difference information.

S44: Detect a goods identifier in the associated image, to use the detected goods identifier as the goods difference information.

When the goods identifier in the associated image fails to be identified, goods information in the associated image is detected by using a goods detection model obtained through a machine learning algorithm, to determine the goods difference information.

Support Vector Machine (SVM), Regions with Convolutional Neural Networks (RCNN, a target detection algorithm), and other machine learning algorithms and variants can be selected as the goods detection model. The selected machine learning algorithm can use sample data to perform training and construction in advance. When an actual scenario or a design-needed condition is satisfied, the algorithm for detecting a goods in an associated image in the present implementation can be used. In an implementation method, after the associated image is obtained, the associated image can be input to the goods detection model for goods detection. In another implementation method, a goods identifier in an associated image can be identified first, for example, a goods barcode or QR code, etc. can be detected. When the goods identifier fails to be identified, a higher-level machine learning algorithm can be used to detect a goods in the associated image, to determine goods information.

S6: The server generates corresponding goods order change information by using the difference information.

After determining the difference information for the change of the goods in the storage container, the corresponding order change information can be generated based on the difference information. For example, when a corresponding goods is detected and a corresponding only price is identified, goods order change information can be generated. The goods order information can indicate that the user adds one goods, and can be used for total order settlement processing of the user.

S8: The server updates user order information corresponding to the client based on the goods order change information.

The server side can record total order information of the user. In an implementation, when the user unlocks the client and uses the storage container for goods selection and purchase, the client can be bound to an identifier of the user, for example, one user is bound to one shopping cart. When identifying a goods that is newly put into or taken out from the shopping cart by the user, the server can generate the corresponding goods order change information, and then can accordingly update, based on the goods order change information, the user order information recorded on the server side, for example, a shopping list with an item added or a shopping list with an item removed.

S10: The server sends updated user order information to the client.

In the implementation scenario in the present implementation, the client side can display order information of an identified goods in the shopping cart to the user, and the user can obtain the order information immediately. When the user order information recorded on the server side is updated, the server side can send updated user order information to the client, so that the client can display the user order information to the user or synchronize the user order information.

S12: The client displays the updated user order information.

When the user puts in a new goods or takes out a goods, the client can receive the user order information updated after the server identifies the goods that is newly puts in or taken out by the user, and then can display the updated user order information, for example, display the user order information on the smartphone installed on the shopping cart, or display the user order information on another display device disposed on the storage container.

According to the goods order processing method provided in one or more implementations of the previous implementations, a photographing device can be installed in a shopping basket, a shopping cart, or other storage containers, and a remote server can identify and determine a user order change by monitoring a change of the goods in the storage container in real time, and can generate or update a shopping list of a user. As such, end-user devices such as an intelligent shopping cart can be used to process data of self-service supermarket orders in combination with a server for goods identification and order processing to reduce self-service cashier devices, sensor devices, etc. With the implementation solutions provided in the present specification, an image capture device or a video shooting device of a client can be used to send image data of goods detection to a server, so that the server performs processes such as goods identification and order settlement. Therefore, overall hardware implementation costs can be lower. In addition, data exchanging nodes can be reduced and solution implementations can be simpler and more convenient. In actual applications, implementation costs of the technical solutions for automatic settlement processing of self-service supermarket goods orders can be greatly reduced, and the technical solutions are convenient to implement and have better stability. An implementation environment and implementation factors such as self-service supermarket size, customer flow volume, and consumer behavior feature have relatively small impact, and facilitate large-scale promotion and use.

Further, the present specification provides another implementation of the method. During identification and detection on the associated image uploaded by the client, if the server side fails to identify a goods in the associated image, for example, fails to scan a barcode or even fails to identify the goods in the associated image by using a goods detection model obtained through machine learning, the server side can send information about the associated image and/or user information and storage container information to an end-user device used for manual identification, for example, a PC end at a manual cashier desk, a dedicated cashier device, or another end-user device disposed for processing a goods detection and identification failure. In the present implementation, the previous end-user devices including the end-user device used for manually identifying and processing an image recognition failure can be collectively referred to cashier nodes. As such, when the server fails to identify the goods in the image, the server can send the image to the cashier node for manual identification processing, which can effectively ensure timely, stable, and continuous processing of goods orders and reducing user shopping experience deterioration caused by goods identification failures on the server side.

In the present implementation, one or more cashier nodes can be disposed. Generally, a plurality of cashier nodes can be disposed in a supermarket. Each cashier node can correspond to one network cashier, and the network cashier can operate a device on the cashier node, identify or discard a received goods image, remind a customer, etc. Therefore, in some implementations of the present application, a task scheduling queue and a network cashier category can be set, to perform more proper task scheduling on a plurality of unidentifiable goods images in a unified manner. In another implementation of the method provided in the present specification, the method can further include the following steps:

S46: If a goods identifier in the associated image fails to be detected, or fails to be detected by using the goods detection model, generate an operation task for the detection failure of the associated image, and place the operation task in a task scheduling queue.

S48: Push, based on an obtained network cashier list, the operation task in the task scheduling queue to cashier nodes that satisfy operation condition, where the network cashier list records processing task operation statuses of cashier nodes.

The operation task can include to-be-processed data information formed based on received information about the image that fails to be identified and other information such as a user identifier and a client identifier. The operation task in the task scheduling queue can be allocated to a cashier node, and the cashier node can perform corresponding processing based on task information. The network cashier list can further be configured. The network cashier list can record current operation statuses of cashier nodes, for example, whether a cashier node is online and how many unprocessed tasks that a certain cashier node currently has, etc. Based on the operation statuses of the cashier nodes in the network cashier list, the tasks in the task scheduling queue can be allocated to the cashier nodes that satisfy operation condition. The operation condition can be specified based on an on-site implementation scenario or a design need. For example, the following can be specified: When a certain channel is used for manual identification, one or more or all operation tasks can be allocated to a specified cashier node for processing, or the operation tasks can be allocated to a cashier node currently with less small operation amount for processing.

Notably, in other implementations, the cashier node is not limited to an end-user for manual identification processing, and can also include an end-user device with a storage, recording, forwarding, or alarming function.

The present specification further provides another implementation method. In some implementation scenarios, when the user fails to select a shopping cart or the server side fails to identify a goods, an identifier of the user is bound to a network cashier. Or, when no network cashier is processing an operation task of a user, a network cashier can be bound to the operation task of the user in the task scheduling queue. As such, when an operation task in a task scheduling queue is allocated, it is first queried whether a network cashier is bound to the task, and if yes, the operation task is allocated to a cashier node of the bound cashier with priority. The bound cashier can include a cashier that is processing an operation task that belongs to the same user as the operation task to be allocated, or a certain cashier specified by the server or the user. Certainly, the binding can also include an implementation method of binding the client to the network cashier. In another implementation of the method provided in the present application, the method can further include the following step:

S47: Query whether a network cashier in the network cashier list is bound to the operation task.

If yes, the corresponding operation task is sent to a cashier node of the corresponding bound network cashier for processing.

In another implementation method, if an operation amount of the bound network cashier has reached a saturated state, for example, a specified maximum processing amount, the operation task can be sent to another network cashier for processing, to balance operation processing load and improve processing efficiency. Therefore, in another implementation of the method in the present application, the method can further include the following step:

S471: After determining the network cashier bound to the operation task, query an operation status of the bound cashier node.

If the operation status indicates a saturated operation amount, the operation task is sent to a cashier node of a network cashier with an unsaturated operation amount in the network cashier list for processing.

In a specific example, for example, a task queue can be saved and each item in the task queue includes a user ID+an associated image that fails to be identified or video content+ an order corresponding to a user ID. In addition, a network cashier list and a task list of each network cashier can be saved. When there is a new operation task for an associated image recognition failure, a user ID is searched to determine whether a network cashier has been bound for processing. If yes, it is determined whether an operation mount of the network cashier is unsaturated. If not, the operation task can be pushed to the network cashier with priority. If the operation mount of the network cashier is saturated, the operation task can be pushed to a new network cashier for processing, and the user ID is bound to an ID of the new cashier. If the operation task corresponding to the user ID is currently not processed by a network cashier, the operation task can be pushed to a new network cashier for processing, and the user ID is bound to an ID of the new network cashier. The new network cashier can be a specified cashier with an unsaturated operation amount or a randomly selected cashier or a network cashier that is selected based on a predetermined sequence.

In another implementation, the operation task (generally including an associated image of a goods identification failure) can be alternatively pushed to a plurality of cashiers for processing, and the plurality of cashiers can mutually check, reference, or combine their results, etc. In another implementation of the method in the present specification, the pushing, based on an obtained network cashier list, the operation task in the task scheduling queue to cashier nodes that satisfy operation condition includes the following: pushing the operation task to at least two cashier nodes; and correspondingly, the identifying information about the goods difference in the storage container based on the associated image includes: determining the information about the goods difference in the storage container based on goods identification results of the at least two cashier nodes.

For example, in some application scenarios with relatively high security needs, an operation task corresponding to one user ID can be pushed to a plurality of cashiers for processing, and the plurality of cashiers can mutually check and review their results. As such, goods identification accuracy can be further improved.

Further, if a network cashier on a cashier node cannot identify a goods in a goods image captured and uploaded by the client either, the network cashier can send a prompt message to the client. The prompt message can include a plurality of types of information, for example, to notify the user that no order can be generated, or return a result of a goods identification failure to the user, to prompt the user about an identification failure. Or, the prompt message can include information used for prompting the user that no order can be generated for a goods that is just put in and the goods need to be re-arranged as needed, or information used for directly identifying an operation task as an unidentified-goods order. In another implementation of the method in the present application, the method can further include the following: if a goods identification result of the cashier node includes a goods identification failure, one of the following is performed:

S691: The server returns a prompt message to the client, where the prompt message includes at least one of information content that a goods order generation failure and a goods re-arrangement request.

S692: Generate an unidentified-goods order corresponding to an associated image for the goods identification failure, and set, based on information about the unidentified-goods order, an identity verification result of a storage container corresponding to the unidentified-goods order to "failed".

In S692, when the storage container needs to pass through a channel apparatus, opening and closing of a gate of the channel apparatus can be controlled based on a result of querying whether there are unidentified goods in the storage container.

If a goods fails to be identified, and the goods that fails to be identified is still in the storage container, the gate of the channel apparatus can be controlled to not open or to close when the storage container needs to pass through an exit. In such a case, the user can move to a manual cashier channel for processing. The channel can include an apparatus that is used in supermarkets, shopping malls, or metro stations for controlling a channel gate to open or close for people or storage containers to pass through. In a specific example, the user ID can be bound to an ID of a used shopping cart. When the user pushes the shopping cart to approach a self-service settlement channel, the user ID or the ID of the shopping cart can be identified through identification code scanning infrared, or other near field communication for self-service settlement. Then, it can be queried at a back end whether there are unidentified goods in a record corresponding to the user ID or the ID of the shopping cart. If there is an unidentified goods in the shopping cart, the shopping cart cannot pass through the self-service settlement channel (which can be controlled by controlling, based on identity verification, the channel gate to open or close), and needs to move to the manual cashier channel for further processing.

The one or more goods order processing methods provided in the previous implementations in the present specification can provide an order settlement method that facilitates users' shopping and has lower implementation costs for merchants. In self-service supermarket applications, a user's shopping list can be identified and confirmed by monitoring a change of the goods in real time (processed through image recognition), and a remote server can generate the user's total order in real time. Order settlement is automatically performed after the user completes shopping, and the user can directly leave the self-service supermarket after completing payment. In such a case, data exchanging nodes are less, there is no need to configure a large number of expensive cashier devices, light curtains, and other sensor devices, implementation costs are lower, and order data processing achieves higher efficiency and is more stable.

Further, the present specification provides another implementation method. The client or the storage container corresponding to the client can use a positioning apparatus, for example, a GPS positioning method or a Ultra Wideband (UWB, which is a carrierless communications technology that uses a non-sinusoidal narrow impulse from a nanosecond level to a picoseconds level to transmit data, and can be used for accurate positioning, particularly, indoor positioning currently) positioning method. An identifier of a certain goods distribution range can be set in the area, commodities in the area can be placed to the same interval, and each interval can correspond to goods information in the interval. As such, when commodities are distributed to different intervals, the goods selected by the user are usually the goods distributed within the intervals. Therefore, a goods interval of a goods selected by the user can be determined in combination with positioning of the storage container and space interval distribution of the goods. When goods cannot be directly identified by using an associated image, the goods can be identified in a goods information range of the goods interval. As such, goods search intervals can be greatly reduced, image recognition search intervals can be reduced, identification speed and identification success rate can be increased, and identification processing load can be reduced. Therefore, in another implementation of the method in the present application, the method can further include the following step:

S14: The client obtains position information of the storage container, and sends the positioning information to the server.

The server determines a goods interval for the change of the goods in the storage container based on the positioning information.

Correspondingly, the server identifies the information about the goods difference in the storage container based on the associated image, including: identifying goods information in the associated image in a range of the goods interval, and determining the difference information for the change of the goods in the storage container based on the identified goods information.

Figure 8:
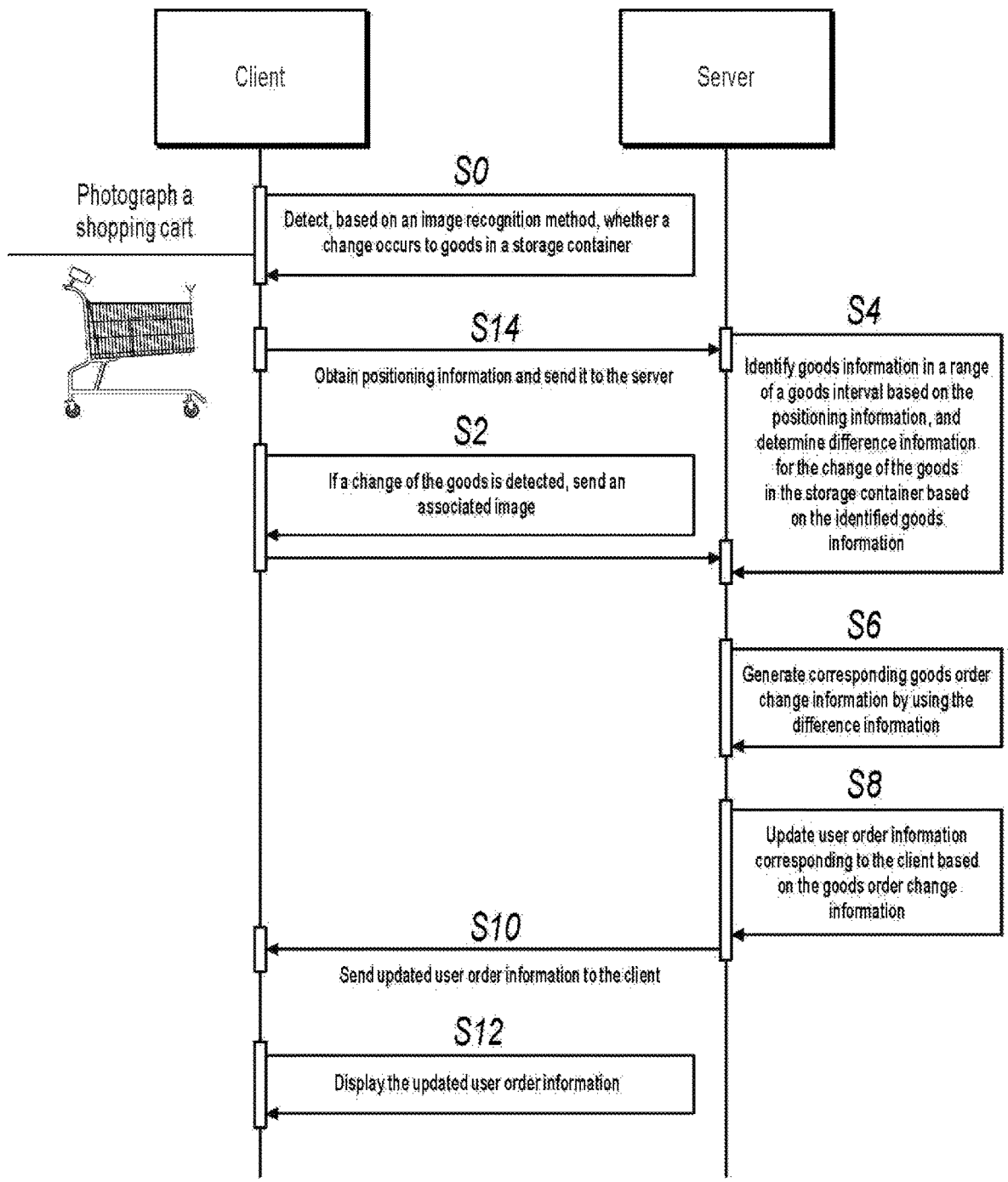
FIG. 8 is a schematic flowchart illustrating another implementation of the method, according to one implementation of the present specification.

FIG. 8 is a schematic flowchart illustrating another implementation of the method, according to one implementation of the present specification. Specific implementations of the present specification are described above. Other implementations fall within the scope of the appended claims. In some situations, the actions or steps described in the claims can be performed in a sequence different from the sequence in the implementation and the desired results can still be achieved. In addition, the process depicted in the accompanying drawings does not necessarily need a particular execution sequence to achieve the desired results. In some implementations, multi-tasking and parallel processing can be advantageous.

The server in the previous implementations can include a separate server, or can be divided into different logical processing units in some application scenarios. For example, the server can include a plurality of logical end-user devices such as a module configured to receive and store an image uploaded by the client, a module configured to analyze the image and identify a goods, a module configured to perform manual task scheduling when automatic goods identification fails, and a network cashier management module. These logical end-user devices can be collectively considered as the server side, or can be separate devices connected or coupled to the server. Similarly, the client can include a photographing device and a communication device that are installed on the shopping cart. In other application scenarios, the photographing device, the communication device, and the shopping cart can be jointly considered as the client, or can be considered as the client together with the positioning device on the shopping cart. In one or more implementations of the present specification, the client and the server can be divided based on different data processing methods/different data processing phases of image detection apparatus 1 used for detecting whether a change of the goods occurs in the storage container and apparatus 2 for image recognition and order processing. The client, the server, and various function modules on the server side can be described based on an actual application environment.

Figure 9:
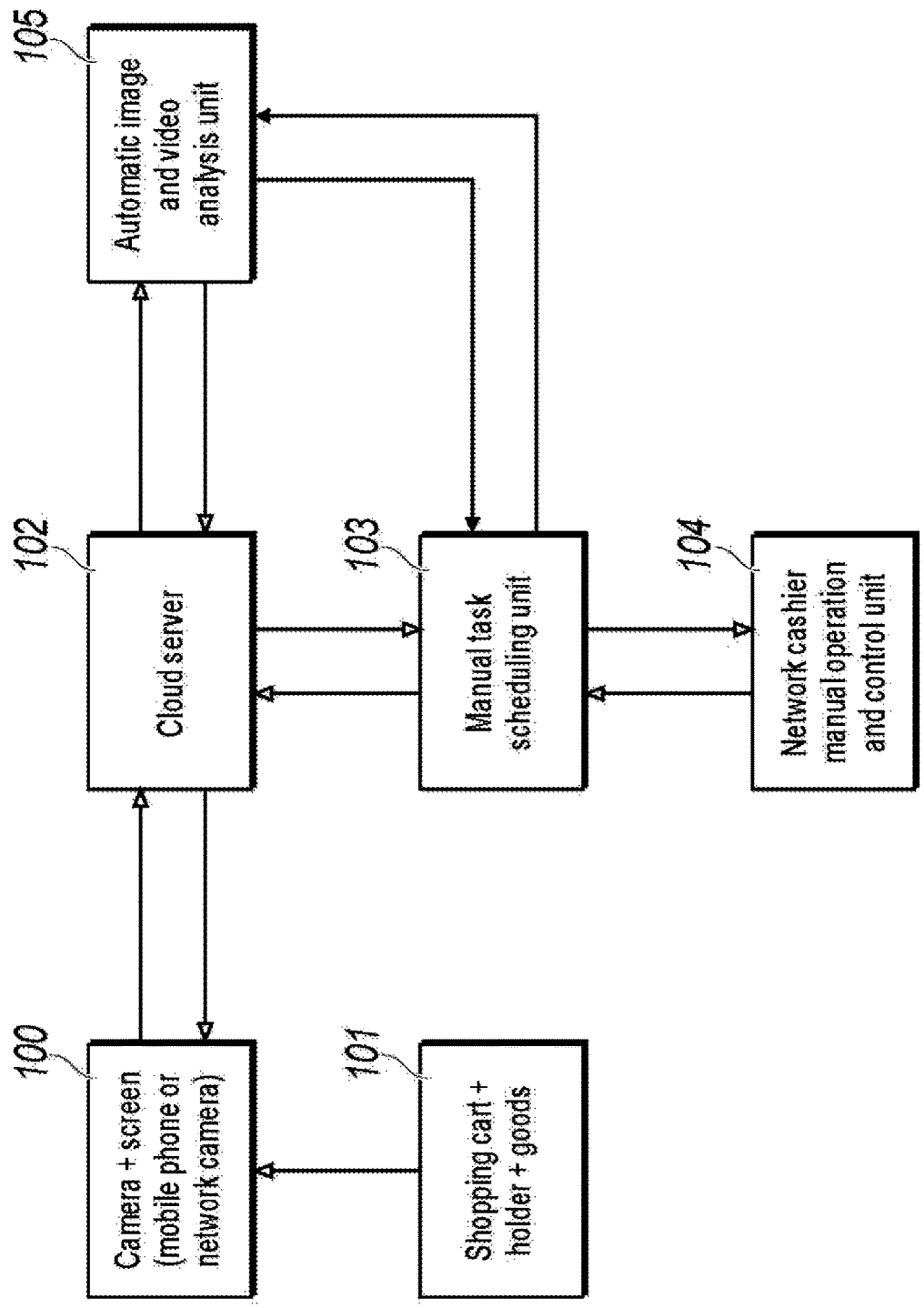
FIG. 9 is a schematic diagram illustrating an implementation scenario of a goods order processing method, according to one implementation of the present specification.

FIG. 9 below is a schematic diagram illustrating an implementation scenario of a goods order processing method, according to one implementation of the present specification. In FIG. 9, a holder can be installed on a shopping cart, to place a mobile phone or a network camera. A server side can be divided into different processing units. Details are as follows:

101: The shopping cart can be a common shopping cart in a shopping mall or a supermarket, and can have capacities such as 60 liters, 80 liters, 100 liters, 125 liters, etc. The holder can be an external mobile phone holder, and can be fastened in front of a handrail of the shopping cart. It can be considered that a user places commodities into the shopping cart one by one during shopping.

100: The mobile phone can include a high-definition rear camera and a screen, and can be placed in the holder in 101. An angle can be adjusted when the holder and the mobile phone are installed, so that the screen is tilted towards the user, and the camera can photograph the shopping cart. The mobile phone runs a photographing application, and can include an image change detection module, to record different images or a video before and after an image change moment for uploading to a cloud server. The changed image areas are uploaded to the cloud, so that an automatic or manual analysis unit on the server side can process the images. Here, one mobile phone can be bound to one user. When the user confirms to use a certain shopping cart through scanning or in other ways, a mobile phone on the shopping cart can be bound to an identifier (ID) of the user.

102: The cloud server or a back end service is connected to and communicates with the mobile phone through WiFi or an operator's network, and can store an image and a video of the shopping cart captured by the camera. The cloud server can be responsible for storing user orders, and inputting content to be analyzed to 105 and 103.

105: An automatic video analysis unit can include a barcode detection and identification module and an alarming module. In other implementations, a machine-learning-based goods detection module can be included. Machine-learning-based detection can be performed based on methods such as SVM and RCNN. When a video and an image are changed, the barcode detection and identification module inputs different images, and searches for a regular barcode. If the identification succeeds, goods are added to the user's shopping list. If the barcode detection fails, the image and video information is sent to the machine-learning-based goods detection module. If the machine-learning-based goods detection module detects corresponding goods and identifies a corresponding only price, the goods can be added to the user's shopping list. If the detection fails, the image can be sent to the alarming module. The alarming module can encapsulate the information into an operation task and send the operation task to a manual task scheduling unit. The operation task can include information such as a user ID+an alarming image or video content+a current order corresponding to the user ID.

103: The manual task scheduling unit can store a task queue, and each item in the task queue can include the user ID+the alarming image or the video content+the order corresponding to the user ID. In addition, the manual task scheduling unit can store a network cashier list and a task list of each network cashier. When there is a new alarming task item, a user ID can be searched, to determine whether a network cashier is bound for processing. If yes, it is determined whether an operation amount of the network cashier is saturated. If the operation amount is unsaturated, the operation task is pushed to the cashier with priority. If the operation mount of the network cashier is saturated, the operation task can be pushed to a new cashier for processing, and the user ID is bound to an ID of the new cashier. If the operation task corresponding to the user ID is currently not processed by a network cashier, the operation task can be pushed to new network cashier for processing, and the user ID is bound to an ID of the new network cashier. For example, as described in some previous implementations, in some application scenarios with relatively high security needs, an operation task corresponding to one user ID can be pushed to a plurality of cashiers for processing, and the plurality of cashiers can mutually check and review their results.

104: A network cashier manual operation and control unit can be connected to and communicate with the manual task scheduling unit through an Ethernet or an operator's network. A screen can be set, to display the alarming image or video. The network cashier can be a real operation person, and the network cashier can observe the alarming image with eyes, to search for and identify a barcode area, and add goods to a user order after the identification succeeds. If the barcode identification fails (for example, due to blocking or other reasons), the network cashier can search the store's goods list for a corresponding goods, and add the goods to the user order upon a search success. If the search fails, the network cashier can mark the goods and return a result to 103. 103 can feed back the result to the user's screen 100, and remind the user that no order can be generated for the goods that are just put in and the goods needs to be re-arranged, or directly put the goods in unidentified items in the user order.

In addition, in other implementation methods, the shopping cart in 101 can be configured with a positioning method similar to UWB, to provide navigation help for customers and collect statistics on a customer flow. Moreover, a goods Stock Keeping Unit (SKU, which can be piece, box, tray, etc.; the SKU is generally construed as a short name for a unified product number, and each product uniquely corresponds to one SKU number) range around a shelf can be learned through positioning, to reduce image recognition search space and improve a machine/manual goods identification success rate.

It can be seen from the descriptions in the previous implementations that, according to the goods order processing method provided in one or more implementations of the present specification, a photographing device can be installed in a shopping basket, a shopping cart, or other storage containers, and a remote server can identify and determine a user order change by monitoring a change of the goods in the storage container in real time, and can generate or update a shopping list of a user. As such, end-user devices such as an intelligent shopping cart can be used to process data of self-service supermarket orders in combination with a server for goods identification and order processing to reduce self-service cashier devices, sensor devices, etc. With the implementation solutions provided in the present specification, an image capture device or a video shooting device of a client can be used to send image data of goods detection to a server, so that the server performs processes such as goods identification and order settlement. Therefore, overall hardware implementation costs can be lower. In addition, data exchanging nodes can be reduced and solution implementations can be simpler and more convenient. In actual applications, implementation costs of the technical solutions for automatic settlement processing of self-service supermarket goods orders can be greatly reduced, and the technical solutions are convenient to implement and have better stability. An implementation environment and implementation factors such as self-service supermarket size, customer flow volume, and consumer behavior feature have relatively small impact, and facilitate large-scale promotion and use.

Figure 10:
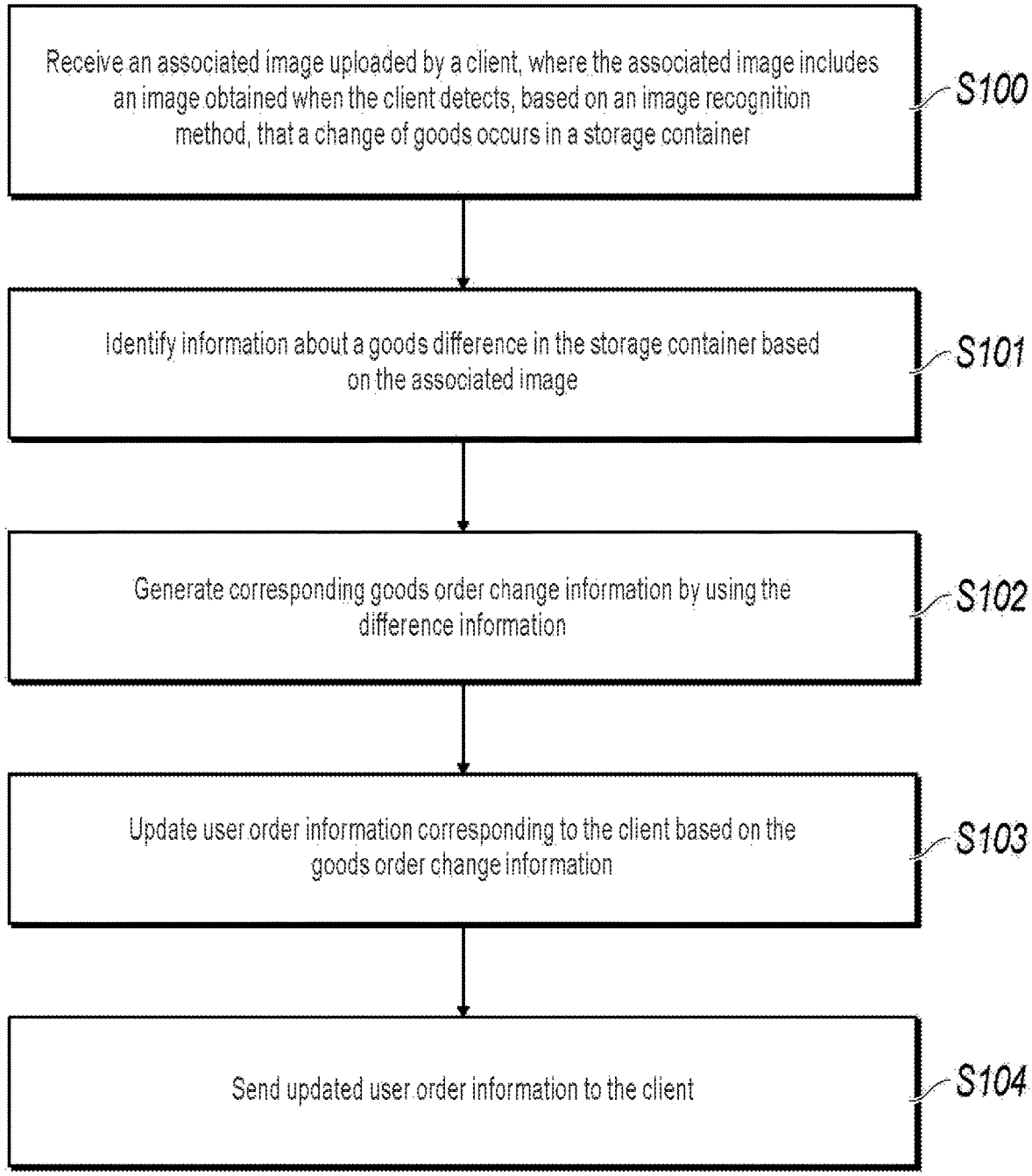
FIG. 10 is a schematic flowchart illustrating an implementation of the method available on a server side, according to one implementation of the present specification.

The previous implementations describe the implementation methods of one or more goods order processing methods provided in the present specification from a perspective of multi-party interaction between the client and the server, or in other words, between the end-user device on the client side and the end-user device on the server side. Based on the descriptions in the previous implementations, the present specification further provides a goods order processing method on the server side. The server can include a separate server operation system, and can alternatively include a single server or a server cluster or a distributed system that has a plurality of processing units used for image storage, image analysis, operation scheduling, etc. The present specification further provides the goods order processing method on available on the server side. FIG. 10 is a schematic flowchart illustrating an implementation of the method available on the server side, according to one implementation of the present specification. As shown in FIG. 10, the method can include the following steps:

S100: Receive an associated image uploaded by a client, where the associated image includes an image obtained when the client detects, based on an image recognition method, that a change of the goods occurs in a storage container.

S101: Identify information about the goods difference in the storage container based on the associated image.

S102: Generate corresponding goods order change information by using the difference information.

S103: Update user order information corresponding to the client based on the goods order change information.

S104: Send updated user order information to the client.

In an implementation of the method, the associated image received by the server can include an image or a video image (a video is considered as continuous images here) obtained when the client detects that a change of the goods occurs in the storage container. The client can detect and identify an image obtained by photographing the storage container, to detect and determine whether a change of the goods occurs in the storage container. For example, subtraction of adjacent goods images can be used, so that when an image difference absolute value in a specified area exceeds a specific threshold, it can be considered that a change of the goods occurs in the storage container. The detecting, based on an image recognition method, whether a change of the goods occurs in a storage container can include the following:

S1001: Obtain goods images of the storage container captured by using a client photographing device.

S1002: Detect difference data between the goods images based on a chronological sequence.

S1003: If the difference data is greater than a predetermined change threshold, determine that a change of the goods occurs in the storage container.

The associated image can include at least one of the following images: S1004: a goods image corresponding to difference data that is greater than the change threshold; S1005: a goods image in a goods image predetermined window range corresponding to a change of the goods moment if it is determined that a change of the goods occurs in the storage container; and S1006: a goods image in a goods image predetermined time range corresponding to a change of the goods moment if it is determined that a change of the goods occurs in the storage container.

The identifying information about the goods difference in the storage container based on the associated image can include the following:

S1011: Detect a goods identifier in the associated image, to use the detected goods identifier as the goods difference information.

In another implementation of the method, any of the following implementation methods can be used:

S1012: After obtaining the associated image, detect goods information in the associated image by using a goods detection model obtained through a machine learning algorithm, to determine the goods difference information.

S1013: Detect a goods identifier in the associated image, to use the detected goods identifier as the goods difference information.

When the goods identifier in the associated image fails to be identified, goods information in the associated image is detected by using a goods detection model obtained through a machine learning algorithm, to determine the goods difference information.

In another implementation of the method provided in the present specification, the method can further include the following steps:

S1014: If goods in the associated image fails to be identified, generate an operation task for the detection failure of the associated image, and place the operation task in a task scheduling queue.

S1015: Push, based on an obtained network cashier list, the operation task in the task scheduling queue to cashier nodes that satisfy an operation condition, where the network cashier list records processing task operation statuses of cashier nodes.

In another implementation of the method provided in the present specification, the method can further include the following steps:

S1016: Query whether a network cashier in the network cashier list is bound to the operation task.

If yes, the corresponding operation task is sent to a cashier node of the corresponding bound network cashier for processing.

In another implementation of the method provided in the present specification, the method can further include the following steps:

S1017: After determining the network cashier bound to the operation task, query operation status of the bound cashier node.

If the operation status indicates a saturated operation amount, the operation task is sent to a cashier node of a network cashier with an unsaturated operation amount in the network cashier list for processing.

Further, in another implementation of the method in the present specification, the pushing, based on an obtained network cashier list, the operation task in the task scheduling queue to cashier nodes that satisfy an operation condition includes the following step:

S1018: Push the operation task to at least two cashier nodes.

Correspondingly, the identifying information about the goods difference in the storage container based on the associated image includes determining the information about the goods difference in the storage container based on goods identification results of the at least two cashier nodes.

In another implementation of the method provided in the present specification, the method can further include the following steps:

S1019: If a goods identification result of the cashier node includes a goods identification failure, perform one of the following: returning a prompt message to the client, where the prompt message includes information content of at least one of a goods order generation failure and a goods re-arrangement; and generating an unidentified-goods order corresponding to an associated image for the goods identification failure, and setting, based on information about the unidentified-goods order, an identity verification result of a storage container corresponding to the unidentified-goods order to "failed".

In another implementation of the method provided in the present specification, the method can further include the following steps:

S10110: Receive positioning information of the storage container uploaded by the client, and determine a goods interval for the change of the goods in the storage container based on the positioning information.

Correspondingly, the identifying information about the goods difference in the storage container based on the associated image includes identifying goods information in the associated image in a range of the goods interval, and determining the difference information for the change of the goods in the storage container based on the identified goods information.

The previous implementations describe a plurality of implementations of the goods order processing method on the server side. For a detailed implementation process and implementation method of the goods order processing method, reference can be made to related descriptions on the implementations of interaction between the client and the server, and details are omitted here.

Figure 11:
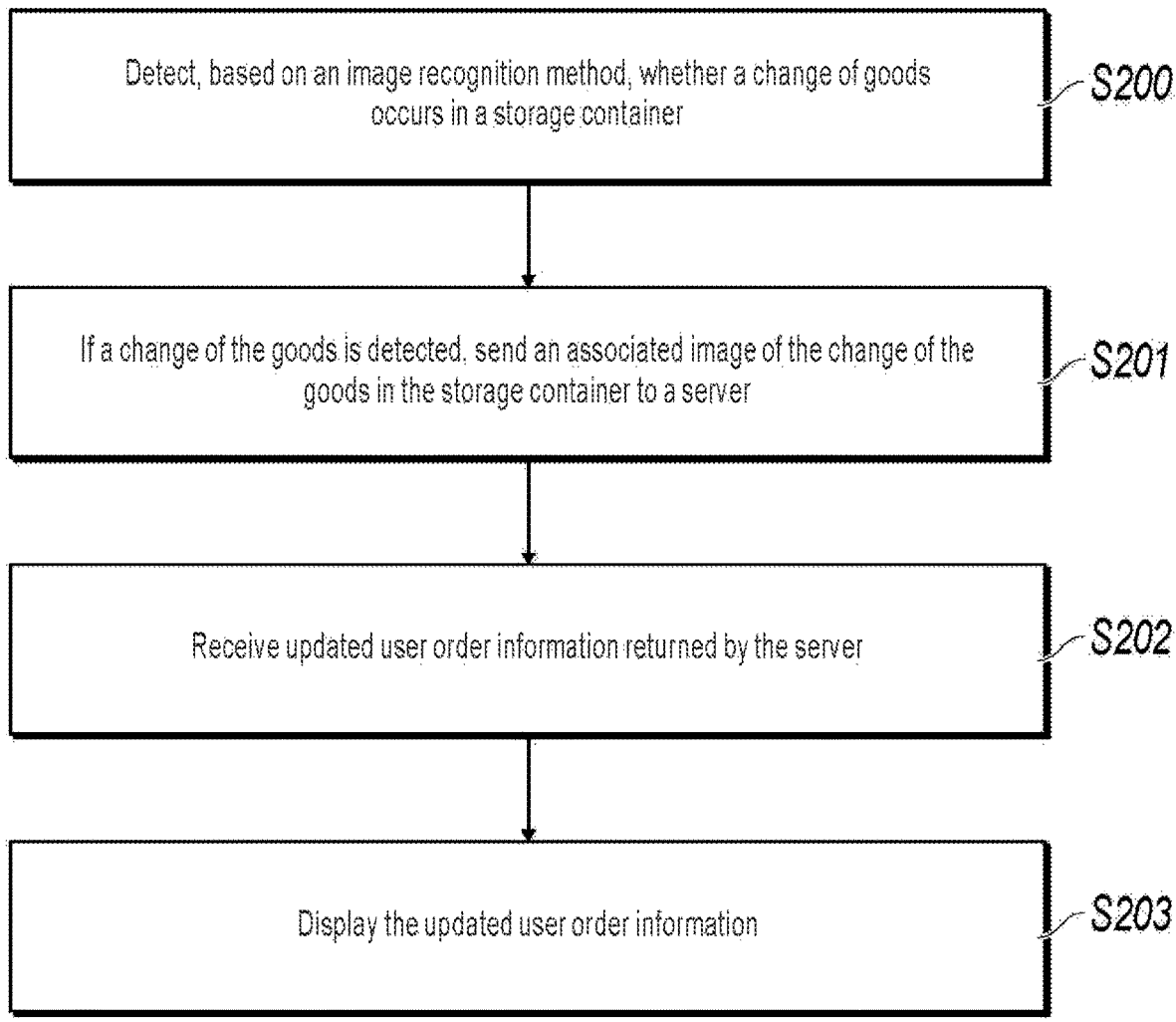
FIG. 11 is a schematic flowchart illustrating an implementation of the method available on a client side, according to one implementation of the present specification.

Certainly, based on the description on the implementations of interaction between the client and the server, the present specification further provides a goods order processing method available on the client side. The client can also include an image change detection module, and can detect a change of the goods in the storage container based on an image obtained by the photographing apparatus. In some other implementation scenarios, one or more of the shopping cart, the holder device, the screen, or the positioning device can be considered as the client together with the photographing apparatus and a data communication apparatus used for image transmission. The method can be applied to the client side, and can detect a change of the goods during shopping, and send an image or a video obtained when the change of the goods occurs to the server for identification and processing, to generate the user's order information. The present specification provides a goods order processing method available on the client side. FIG. 11 is a schematic flowchart illustrating an implementation of the method available on the client side, according to one implementation of the present specification. As shown in FIG. 11, the method can include the following steps.

S200: Detect, based on an image recognition method, whether a change of the goods occurs in a storage container.

S201: If a change of the goods is detected, send an associated image of the change of the goods in the storage container to a server.

S202: Receive updated user order information returned by the server.

S203: Display the updated user order information.

Reference can be made to the previous implementations. In another goods order processing method available on the client side provided in the present specification, the detecting, based on an image recognition method, whether a change of the goods occurs in a storage container can include the following steps.

S2001: Capture goods images of the storage container by using a photographing device.

S2002: Detect difference data between the goods images based on a chronological sequence.

S2003: If the difference data is greater than a predetermined change threshold, determine that a change of the goods occurs in the storage container.

The associated image can be determined in a plurality of ways. In another implementation of the method provided in the present specification, the associated image can include at least one of the following images: S2004: a goods image corresponding to difference data that is greater than the change threshold; S2005: a goods image in a goods image predetermined window range corresponding to a change of the goods moment if it is determined that a change of the goods occurs in the storage container; and S2006: a goods image in a goods image predetermined time range corresponding to a change of the goods moment if it is determined that a change of the goods occurs in the storage container.

Figure 12:
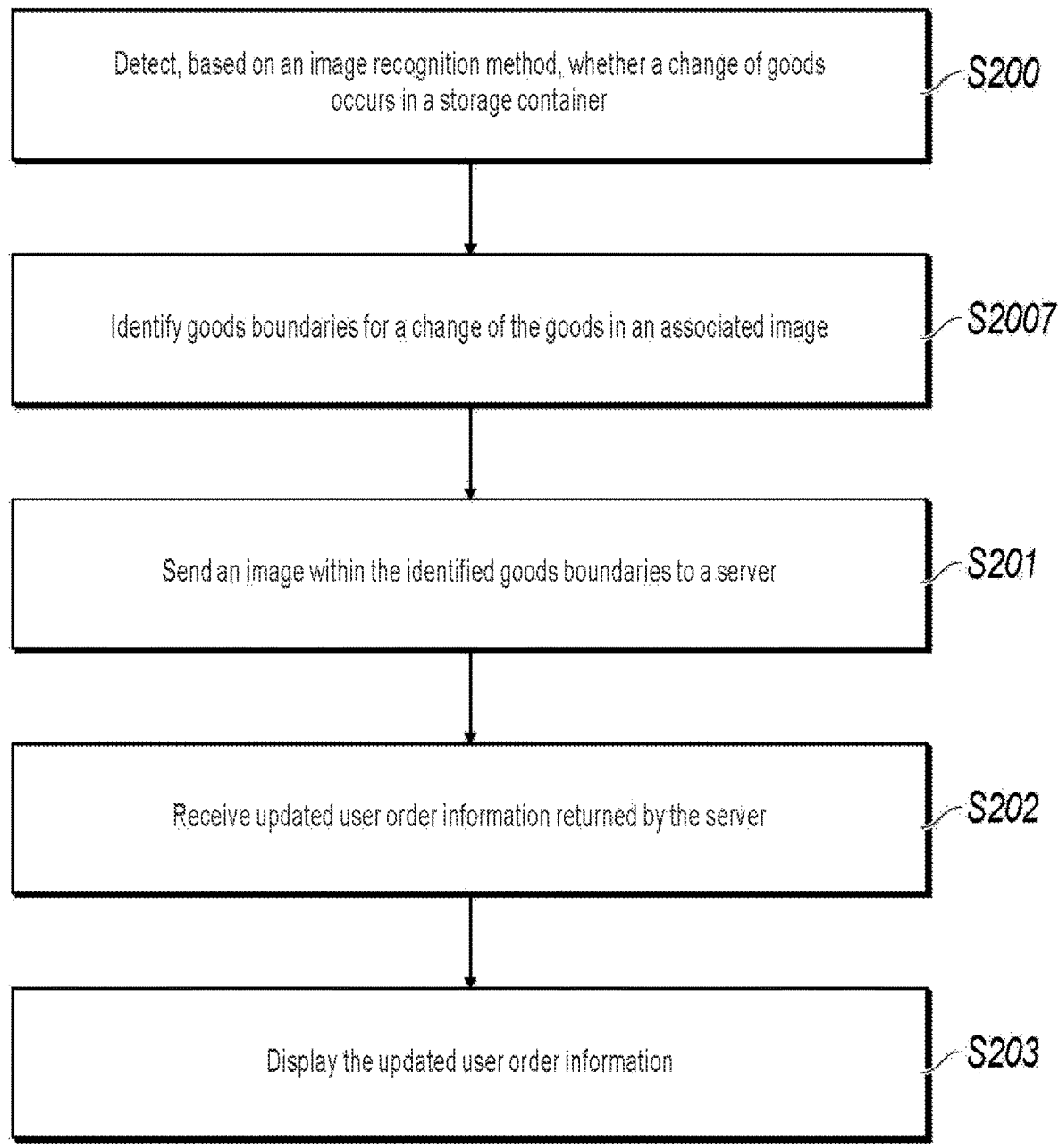
FIG. 12 is a schematic flowchart illustrating another implementation of the method available on a client side, according to one implementation of the present specification.

FIG. 12 is a schematic flowchart illustrating another implementation of the method available on the client side, according to one implementation of the present specification. In another implementation, when uploading the associated image, the client can send only the images that show changes to goods to the server for processing, to save network bandwidth and increase processing speed. In another implementation of the method, after the associated image is obtained, the method can further include the following step.

S2007: Identify goods boundaries for a change of the goods in an associated image.

Correspondingly, the sending an associated image to a server can include: sending an image within the identified goods boundaries to the server.

Further, a positioning method similar to UWB can be configured on the shopping cart, to provide navigation help for customers and collect statistics on a customer flow. Moreover, a goods SKU range around a shelf can be positioned, to reduce image recognition search space and improve machine/manual goods identification success rate. In another implementation of the method, the method can further include the following step:

S2008: Obtain positioning information of the storage container, and sending the positioning information to the server, so that the server determines a goods interval for a goods in the storage container based on the positioning information.

It can be seen from the plurality of implementations for interaction between the client and the server, the server side, and the client side, the goods order processing method provided in the present specification can be applied to application scenarios with consumer self-service shopping, platform-based automatic goods identification, and order settlement in self-service supermarkets. According to the implementations provided in the present specification, a photographing device can be installed in a shopping basket, a shopping cart, or other storage containers, and a remote server can identify and determine a user order change by monitoring a change of the goods in the storage container in real time, and can generate or update a shopping list of a user. As such, end-user devices such as an intelligent shopping cart can be used to process data of self-service supermarket orders in combination with a server for goods identification and order processing to reduce self-service cashier devices, sensor devices, etc. With the implementation solutions provided in the present specification, an image capture device or a video shooting device of a client can be used to send image data of goods detection to a server, so that the server performs processes such as goods identification and order settlement. Therefore, overall hardware implementation costs can be lower. In addition, data exchanging nodes can be reduced and solution implementations can be simpler and more convenient. In actual applications, implementation costs of the technical solutions for automatic settlement processing of self-service supermarket goods orders can be greatly reduced, and the technical solutions are convenient to implement and have better stability. An implementation environment and implementation factors such as self-service supermarket size, customer flow volume, and consumer behavior feature have relatively small impact, and facilitate large-scale promotion and use.

Figure 13:
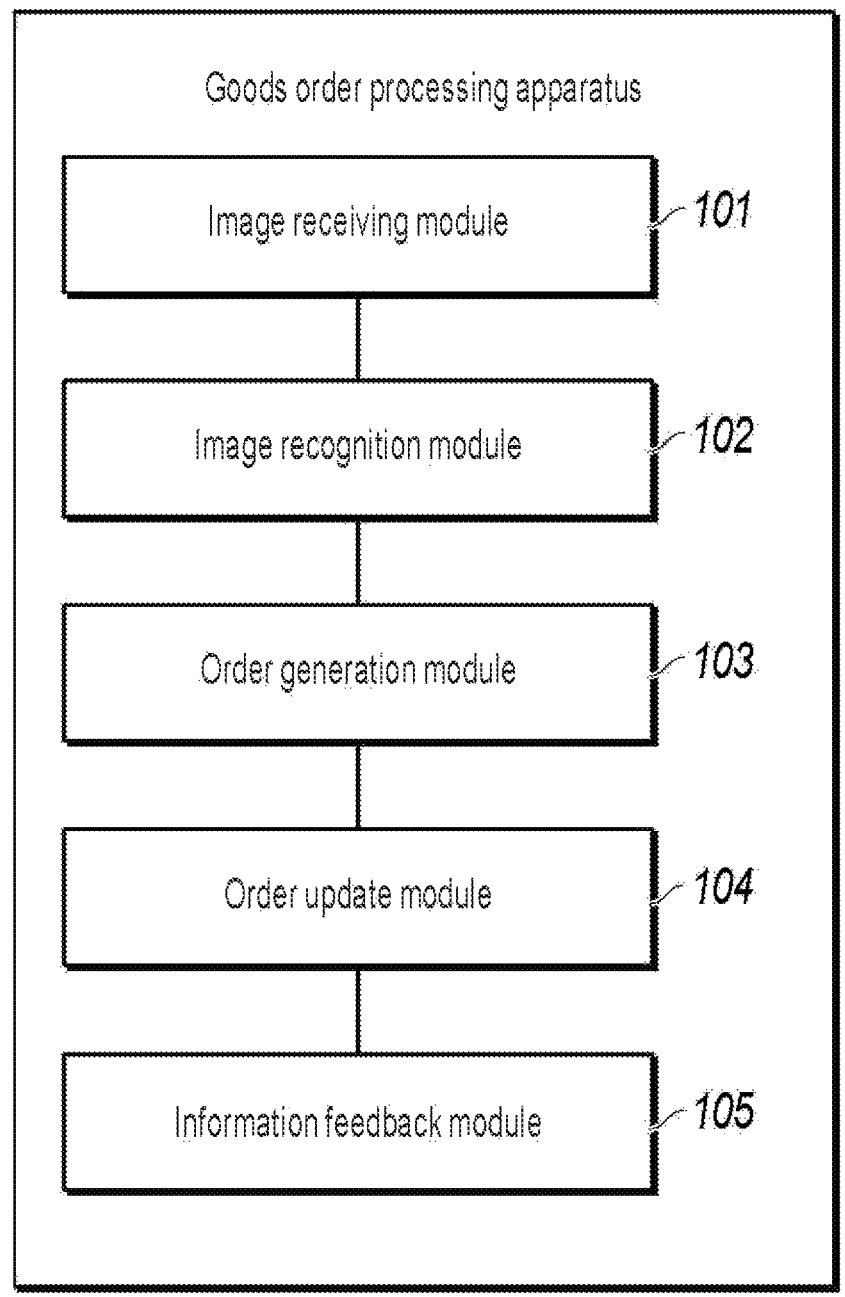
FIG. 13 is a schematic structural diagram illustrating modules of an implementation of a goods order processing apparatus available on a server side, according to one implementation of the present specification.

Based on the previous goods order processing method, one or more implementations of the present specification further provide a goods order processing apparatus. The apparatus can include an apparatus that combines necessary implementation hardware and uses a system (including a distributed system), software (an application), a module, a component, a server, a client, etc. of the method in the implementations of the present specification. Based on a same innovative concept, the apparatus provided in the one or more implementations of the present specification is described in the following implementations. Because a problem-resolving implementation solution of the apparatus is similar to a problem-resolving implementation solution of the method, for specific implementation of the apparatus in the implementations of the present specification, reference can be made to the implementation of the previous method. No repeated description is provided. A term "unit" or "module" used in the following implementations can implement a combination of software and/or hardware of a predetermined function. Although the apparatus described in the following implementations is preferably implemented by software, implementation by hardware or a combination of software and hardware is possible to conceive. FIG. 13 is a schematic structural diagram illustrating modules of an implementation of a goods order processing apparatus available on a server side, according to one implementation of the present specification. As shown in FIG. 13, the apparatus can include the following: an image receiving module 101, configured to receive an associated image uploaded by a client, where the associated image includes an image obtained when the client detects, based on an image recognition method, that a change of the goods occurs in a storage container; an image recognition module 102, configured to identify information about the goods difference in the storage container based on the associated image; an order generation module 103, configured to generate corresponding goods order change information by using the difference information; an order update module 104, configured to update user order information corresponding to the client based on the goods order change information; and an information feedback module 105, configured to send updated user order information to the client.

In another implementation of the apparatus, the detecting, based on an image recognition method, whether a change of the goods occurs in a storage container can include the following: capturing goods images of the storage container by using a client photographing device; detecting difference data between the goods images based on a chronological sequence; and if the difference data is greater than a predetermined change threshold, determining that a change of the goods occurs in the storage container.

In another implementation of the apparatus, the associated image can include at least one of the following images: a goods image corresponding to difference data that is greater than the change threshold; a goods image in a goods image predetermined window range corresponding to a change of the goods moment if it is determined that a change of the goods occurs in the storage container; and a goods image in a goods image predetermined time range corresponding to a change of the goods moment if it is determined that a change of the goods occurs in the storage container.

Figure 14:
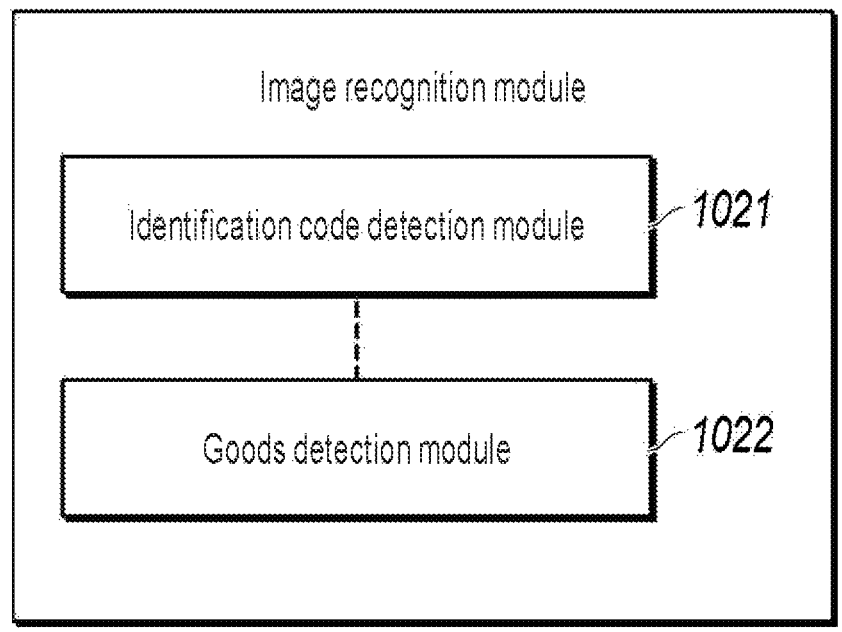
FIG. 14 is a schematic structural diagram illustrating modules of an implementation of an image recognition module in the apparatus, according to one implementation of the present specification.

FIG. 14 is a schematic structural diagram illustrating modules of an implementation of an image recognition module in the apparatus, according to one implementation of the present specification. As shown in FIG. 14, the image recognition module 102 can include the following: an identification code detection module 1021, configured to detect a goods identifier in the associated image, to use the detected goods identifier as the goods difference information.

As shown in FIG. 14, the image recognition module 102 in an implementation of the apparatus can include the following: a goods detection module 1022, where the goods detection module 1022 includes a goods detection model obtained after sample training performed based on a selected machine learning algorithm, configured to detect goods information in the associated image after the associated image is obtained, to determine the goods difference information; or configured to detect goods information in the associated image when the goods identifier in the associated image fails to be identified, to determine the goods difference information.

Figure 15:
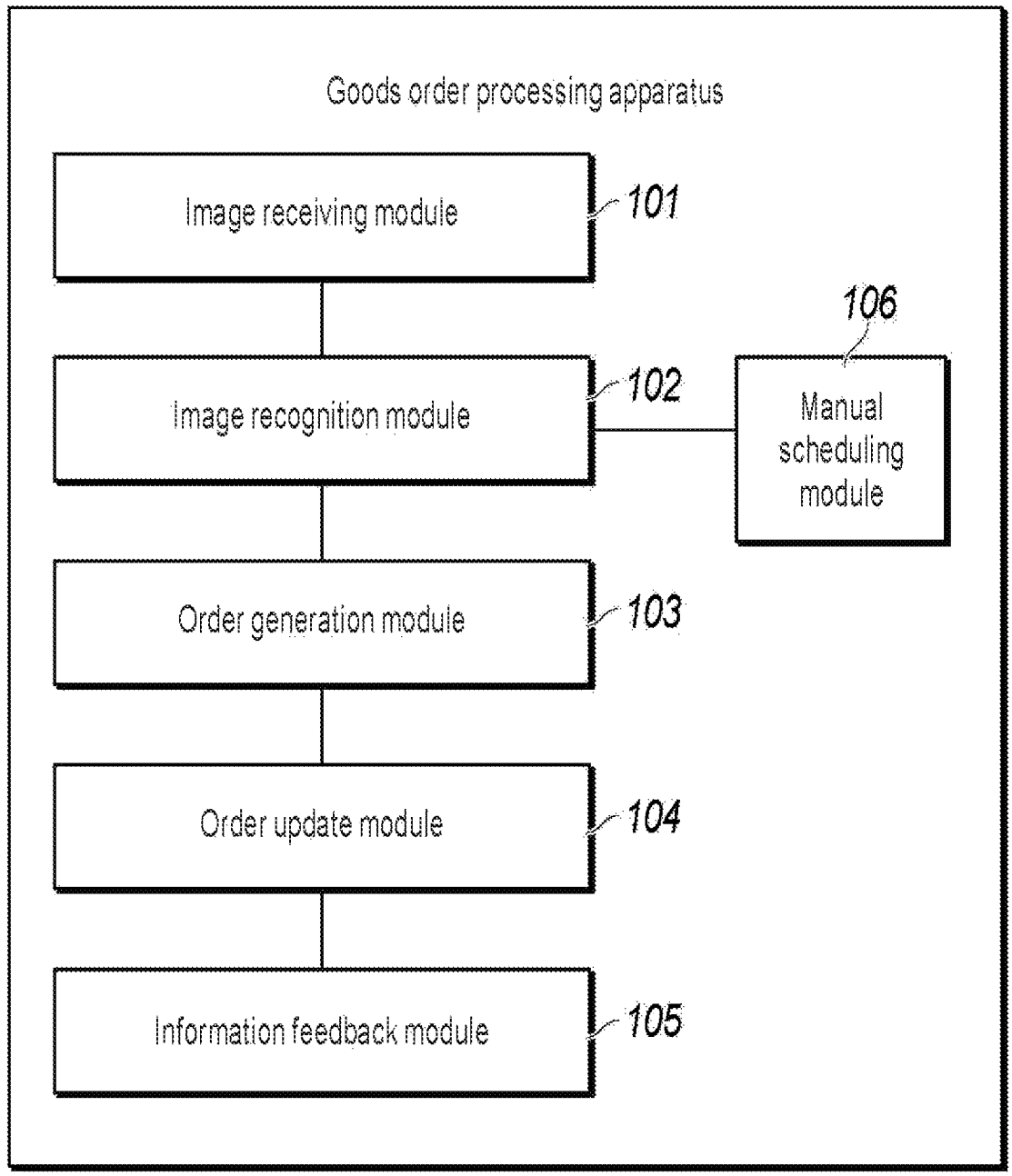
FIG. 15 is a schematic structural diagram illustrating modules of another implementation of the apparatus, according to one implementation of the present specification.

FIG. 15 is a schematic structural diagram illustrating modules of another implementation of the apparatus, according to one implementation of the present specification. As shown in FIG. 15, the apparatus can further include the following: a manual scheduling module 106, configured to, if a goods identifier in the associated image fails to be detected, or fails to be detected by using the goods detection model, generate an operation task for the detection failure of the associated image, and place the operation task in a task scheduling queue; and push, based on an obtained network cashier list, the operation task in the task scheduling queue to cashier nodes that satisfy an operation condition, where the network cashier list records processing task operation statuses of cashier nodes.

Figure 16:
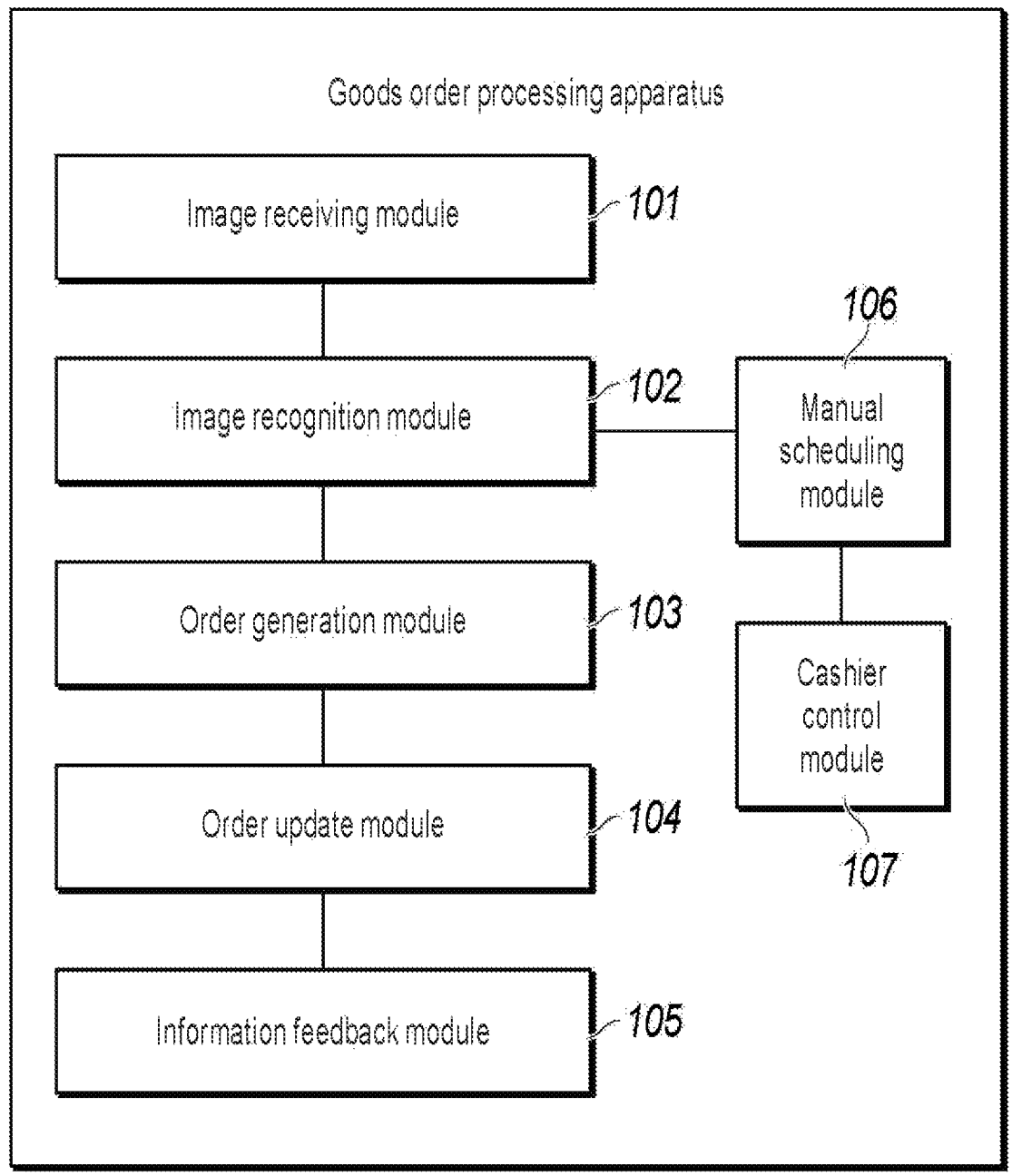
FIG. 16 is a schematic structural diagram illustrating modules of another implementation of the apparatus, according to one implementation of the present specification.

FIG. 16 is a schematic structural diagram illustrating modules of another implementation of the apparatus, according to one implementation of the present specification. As shown in FIG. 16, in another implementation of the apparatus, the apparatus can further include the following: a cashier control module 107, configured to query whether a network cashier in the network cashier list is bound to the operation task; and if yes, send the corresponding operation task to a cashier node of the corresponding bound network cashier for processing.

In another implementation of the apparatus, after determining the network cashier bound to the operation task, the cashier control module 107 can be further configured to query an operation status of the bound cashier node; and if the operation status indicates a saturated operation amount, send the operation task to a cashier node of a network cashier with an unsaturated operation amount in the network cashier list for processing.

In another implementation of the apparatus, the manual scheduling module 106 pushes, based on the obtained network cashier list, the operation task in the task scheduling queue to the cashier nodes that satisfy the operation condition, including: pushing the operation task to at least two cashier nodes; and correspondingly, the image recognition module 102 identifies the information about the goods difference in the storage container based on the associated image, including: determining the information about the goods difference in the storage container based on goods identification results of the at least two cashier nodes.

In another implementation of the apparatus, a goods identification result of the cashier node includes a goods identification failure, the information feedback module 105 performs one of the following: returning a prompt message to the client, where the prompt message includes information content of at least one of a goods order generation failure and a goods re-arrangement; and generating an unidentified-goods order corresponding to an associated image for the goods identification failure, and setting, based on information about the unidentified-goods order, an identity verification result of a storage container corresponding to the unidentified-goods order to "failed".

Figure 17:
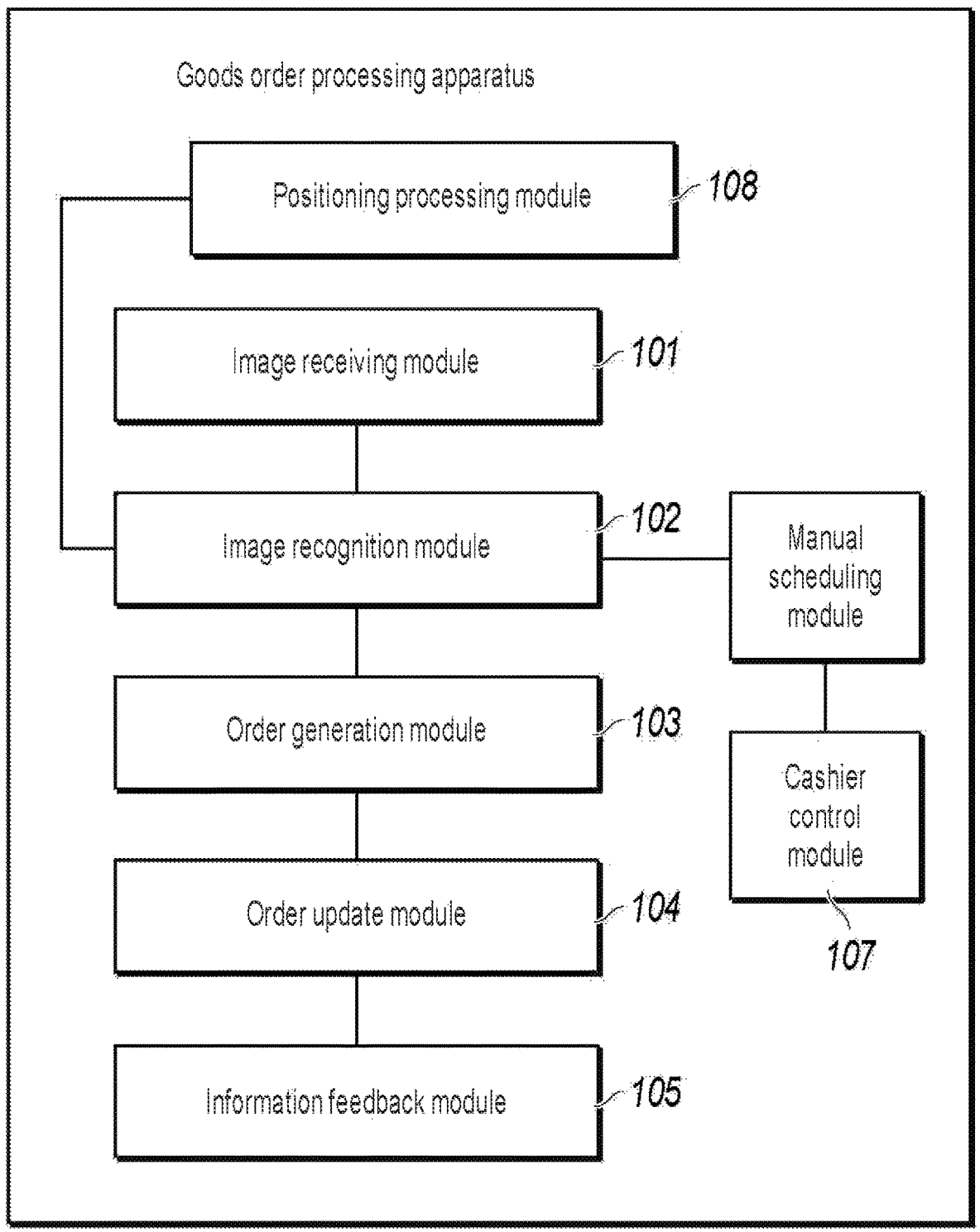
FIG. 17 is a schematic structural diagram illustrating modules of another implementation of the apparatus, according to one implementation of the present specification.

FIG. 17 is a schematic structural diagram illustrating modules of another implementation of the apparatus, according to one implementation of the present specification. As shown in FIG. 17, in another implementation of the apparatus, the apparatus can further include the following: a positioning processing module 108, configured to receive positioning information of the storage container uploaded by the client, and determining a goods interval for the change of the goods in the storage container based on the positioning information; and correspondingly, the image recognition module 102 identifies the information about the goods difference in the storage container based on the associated image, including: identifying goods information in the associated image in a range of the goods interval, and determining the difference information for the change of the goods in the storage container based on the identified goods information.

Notably, the previous apparatus can further include another implementation method based on the descriptions of the implementations of interaction between the client and the server and the method implementations on the server side. For a specific implementation method, reference can be made to the descriptions in the related method implementations, and details are omitted here.

Specific implementations of the present specification are described above. Other implementations fall within the scope of the appended claims. In some situations, the actions or steps described in the claims can be performed in a sequence different from the sequence in the implementation and the desired results can still be achieved. In addition, the process depicted in the accompanying drawings does not necessarily need a particular execution sequence to achieve the desired results. In some implementations, multi-tasking and parallel processing can be advantageous. For example, the manual scheduling module 106 and the cashier control module 107 can be combined into one processing unit or one function module to implement the steps of the modules.

Figure 18:
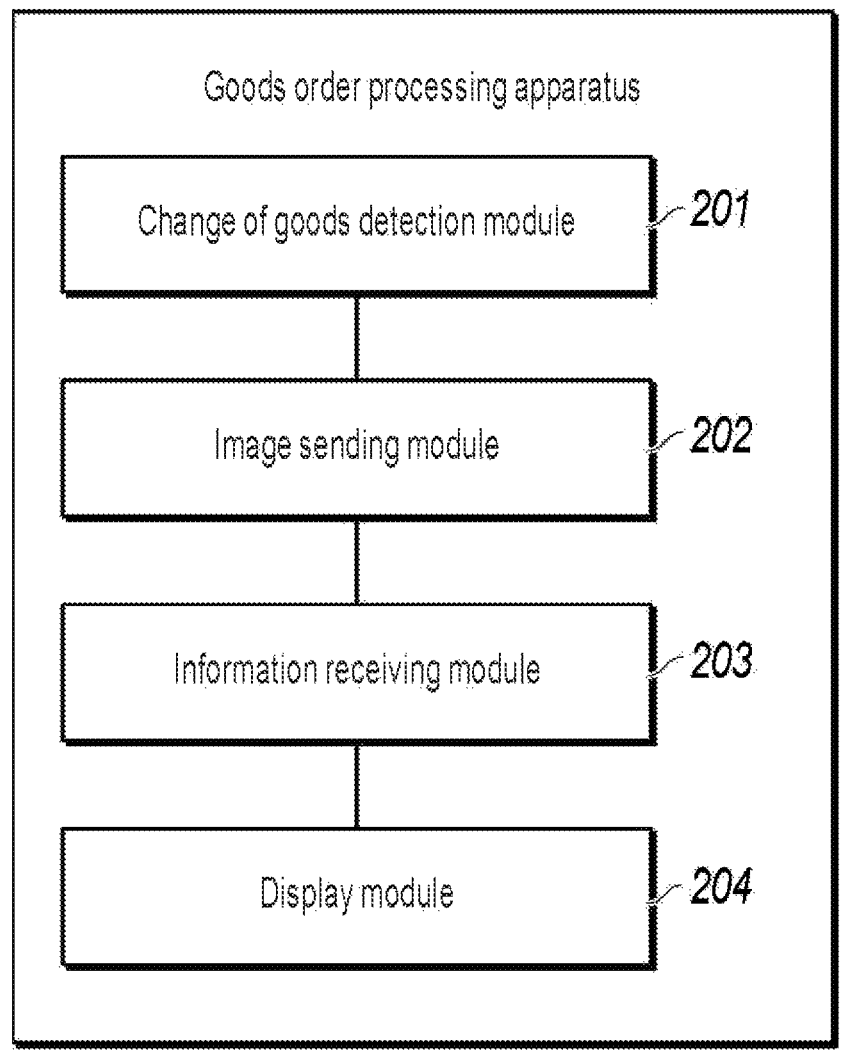
FIG. 18 is a schematic structural diagram illustrating modules of an implementation of a goods order processing apparatus, according to one implementation of the present specification.

The present specification further provides a goods order processing apparatus available on a client side. FIG. 18 is a schematic structural diagram illustrating modules of an implementation of a goods order processing apparatus, according to one implementation of the present specification. As shown in FIG. 18, the apparatus can include the following: a change of the goods detection module 201, configured to detect, based on an image recognition method, whether a change of the goods occurs in a storage container; an image sending module 202, configured to, if a change of the goods is detected, send an associated image of the change of the goods in the storage container to a server; an information receiving module 203, configured to receive updated user order information returned by the server; and a display module 204, configured to display the updated user order information.

Figure 19:
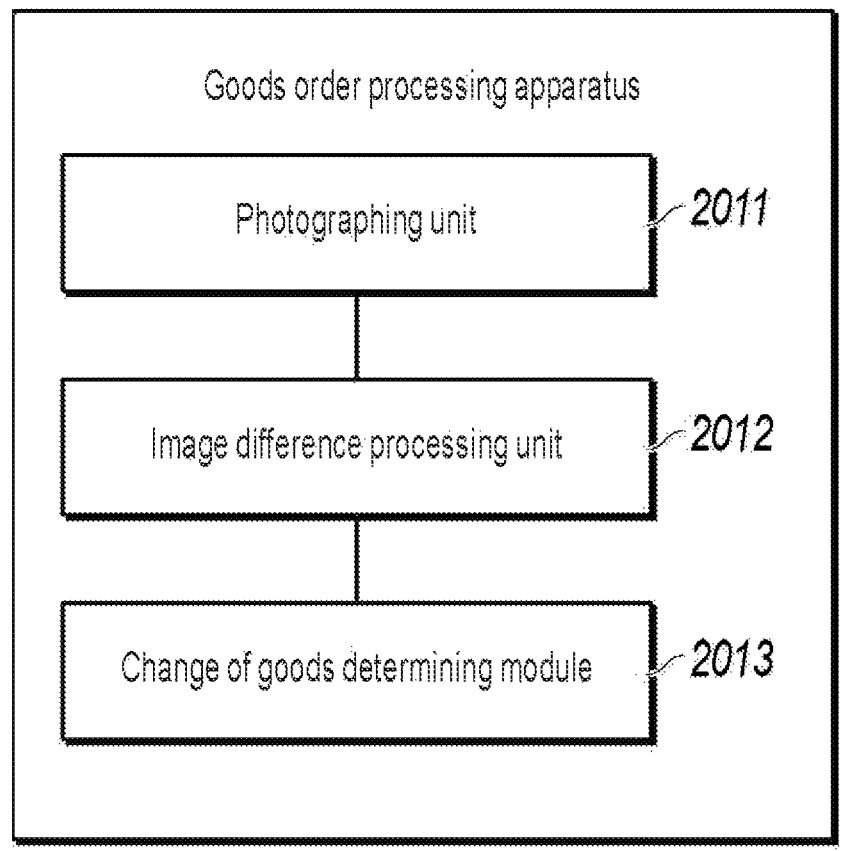
FIG. 19 is a schematic structural diagram illustrating modules of an implementation of a change of the goods detection module in the apparatus, according to one implementation of the present specification.

FIG. 19 is a schematic structural diagram illustrating modules of an implementation of a change of the goods detection module in the apparatus, according to one implementation of the present specification. As shown in FIG. 19, the change of the goods detection module 201 can include the following: a photographing unit 2011, configured to capture goods images of the storage container; an image difference processing unit 2012, configured to detect difference data between the goods images based on a chronological sequence; and a change of the goods determining module 2013, configured to, if the difference data is greater than a predetermined change threshold, determine that a change of the goods occurs in the storage container.

In another implementation of the apparatus, the associated image in the image sending module 202 includes at least one of the following images: a goods image corresponding to difference data that is greater than the change threshold; a goods image in a goods image predetermined window range corresponding to a change of the goods moment if it is determined that a change of the goods occurs in the storage container; and a goods image in a goods image predetermined time range corresponding to a change of the goods moment if it is determined that a change of the goods occurs in the storage container.

Figure 20:
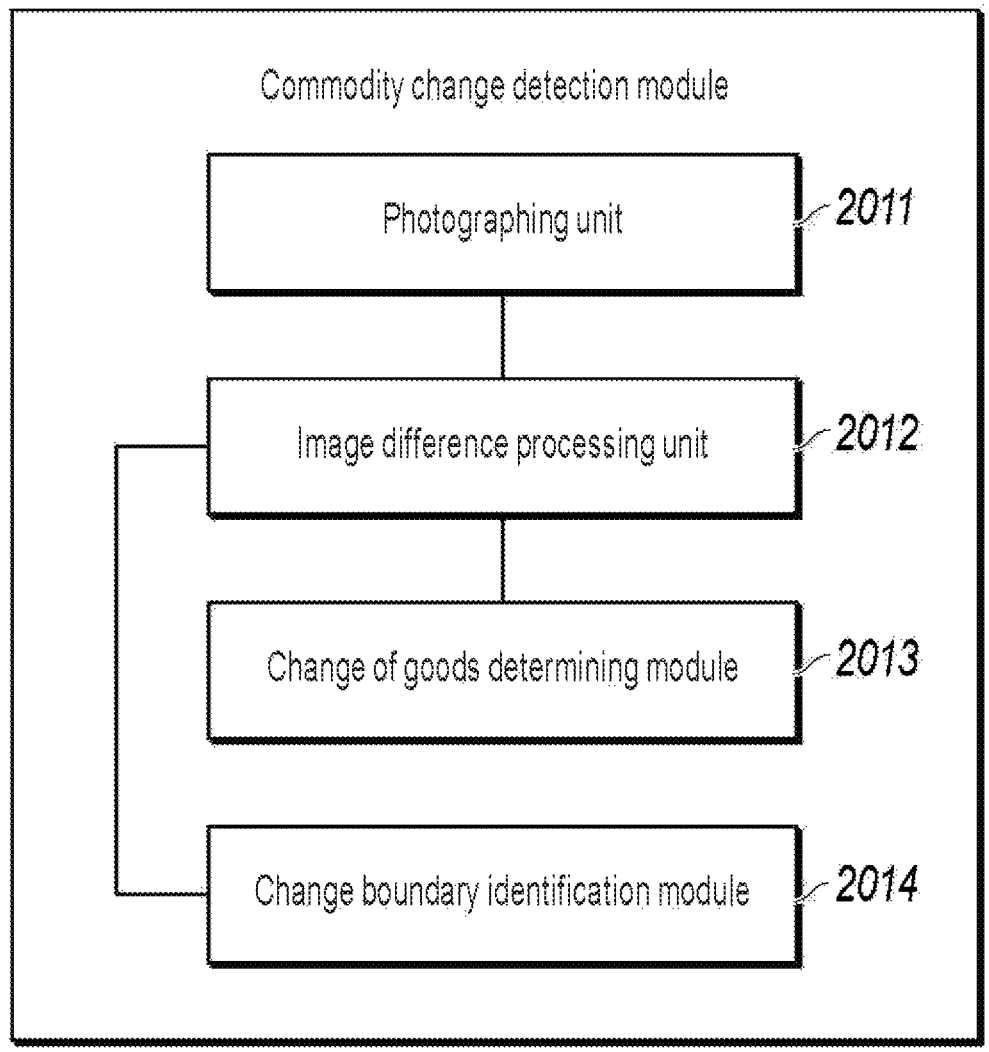
FIG. 20 is a schematic structural diagram illustrating modules of another implementation of a change of the goods detection module in the apparatus, according to one implementation of the present specification.

FIG. 20 is a schematic structural diagram illustrating modules of another implementation of a change of the goods detection module in the apparatus, according to one implementation of the present specification. As shown in FIG. 20, the change of the goods detection module 201 can include the following: a change boundary identification module 2014, configured to identify goods boundaries for a change of the goods in the associated image; and correspondingly, the image sending module 202 sends the associated image to the server, including: sending an image within the identified goods boundaries to the server.

Figure 21:
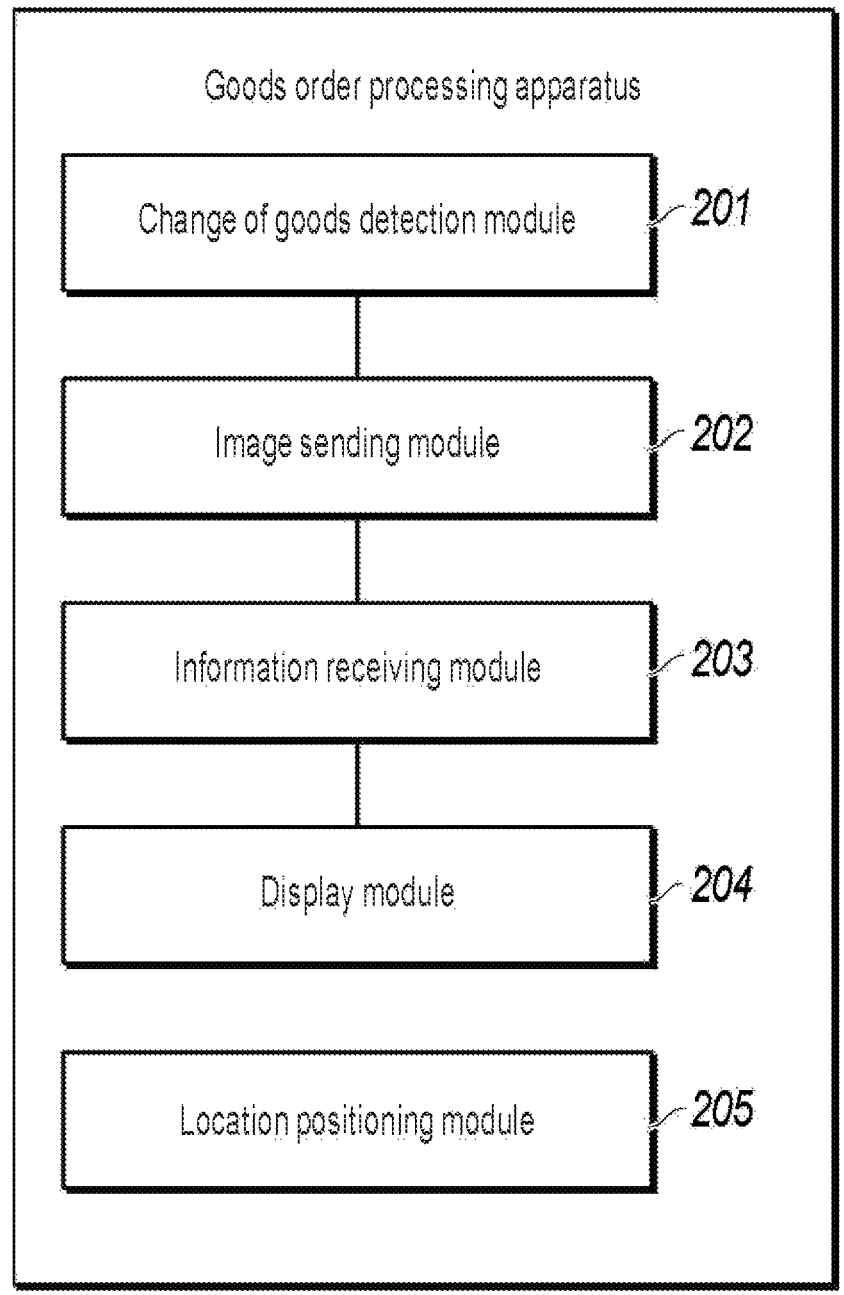
FIG. 21 is a schematic structural diagram illustrating modules of another implementation of the apparatus, according to one implementation of the present specification.

FIG. 21 is a schematic structural diagram illustrating modules of another implementation of the apparatus, according to one implementation of the present specification. As shown in FIG. 21, the apparatus can further include the following: a location positioning module 205, configured to obtain positioning information of the storage container, and send the positioning information to the server, so that the server determines a goods interval of a goods in the storage container based on the positioning information.

Notably, the previous apparatus can further include another implementation method based on the descriptions of the implementations of interaction between the client and the server and the method implementations on the client side. For a specific implementation method, reference can be made to the descriptions in the related method implementations, and details are omitted here.

Specific implementations of the present specification are described above. Other implementations fall within the scope of the appended claims. In some situations, the actions or steps described in the claims can be performed in a sequence different from the sequence in the implementation and the desired results can still be achieved. In addition, the process depicted in the accompanying drawings does not necessarily need a particular execution sequence to achieve the desired results. In some implementations, multi-tasking and parallel processing can be advantageous. For example, the image sending module 202 and the information receiving module 203 can be combined into one communication module to implement the steps of the modules.

According to the goods order processing apparatus provided in one or more implementations of the present specification, a photographing device can be installed in a shopping basket, a shopping cart, or other storage containers, and a remote server can identify and determine a user order change by monitoring a change of the goods in the storage container in real time, and can generate or update a shopping list of a user. As such, end-user devices such as an intelligent shopping cart can be used to process data of self-service supermarket orders in combination with a server for goods identification and order processing to reduce self-service cashier devices, sensor devices, etc. With the implementation solutions provided in the present specification, an image capture device or a video shooting device of a client can be used to send image data of goods detection to a server, so that the server performs processes such as goods identification and order settlement. Therefore, overall hardware implementation costs can be lower. In addition, data exchanging nodes can be reduced and solution implementations can be simpler and more convenient. In actual applications, implementation costs of the technical solutions for automatic settlement processing of self-service supermarket goods orders can be greatly reduced, and the technical solutions are convenient to implement and have better stability. An implementation environment and implementation factors such as a self-service supermarket size, a customer flow volume, and a consumer behavior feature have relatively small impact, and facilitate large-scale promotion and use.

Figure 22:
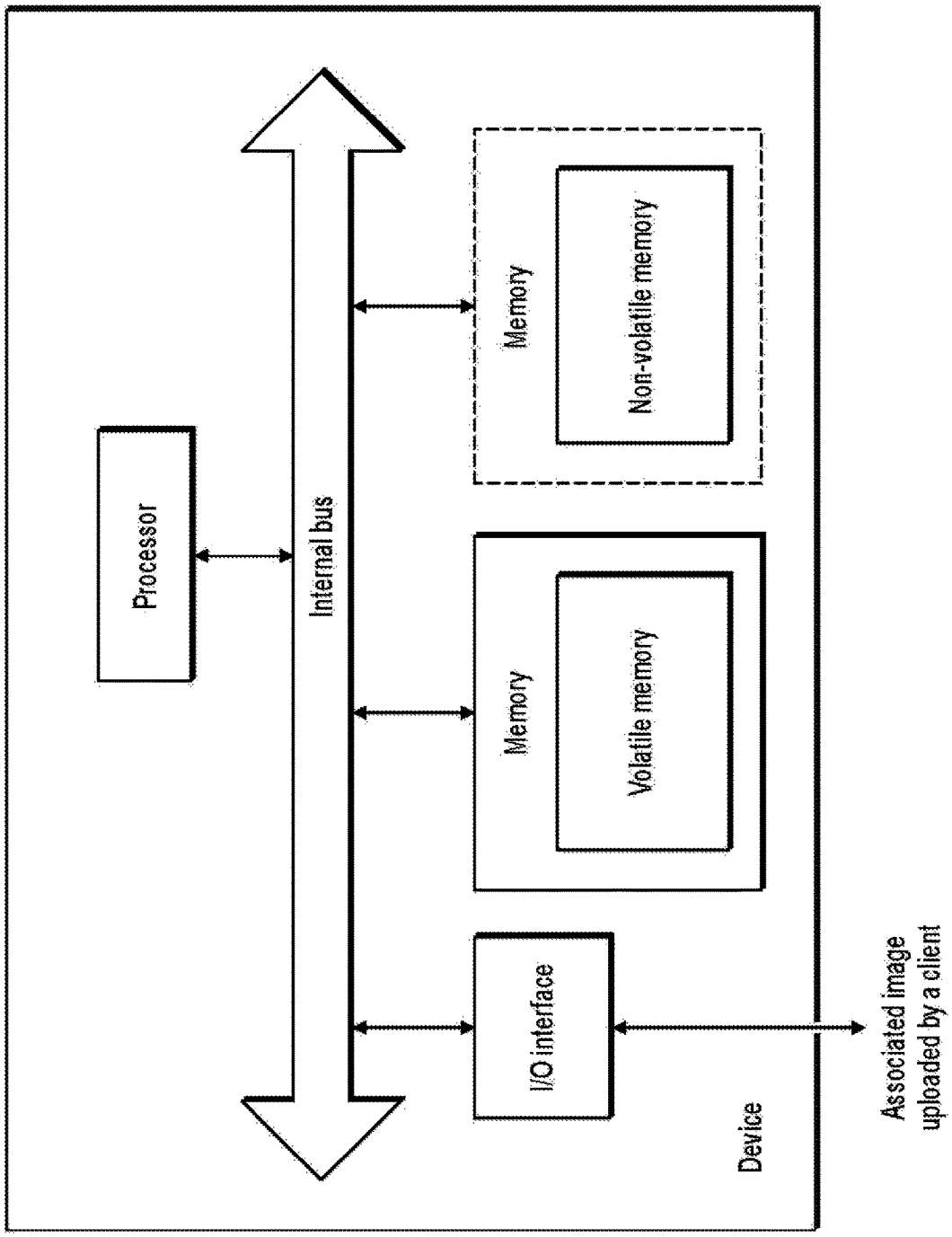
FIG. 22 is a schematic structural diagram illustrating an implementation of the apparatus implemented in combination with computer hardware, according to one implementation of the present specification.

The goods order processing method or apparatus provided in the implementations of the present specification can be implemented by a processor executing a corresponding program instruction in a computer. For example, it can be implemented at a PC end by using the C++ language in a Windows operating system, or implemented by using a corresponding program design language in another system such as Linux, Android, or IOS, or implemented based on processing logic of a quantum computer. The apparatus can be applied to a plurality of servers such as a plurality of types of order settlement system platforms, self-service shopping order processing systems, and shopping cloud service system, to implement rapid, highly-efficient, and reliable user goods order processing with low costs. The present specification provides a server. As shown in FIG. 22, the server can include at least one processor and a memory configured to store an instruction executable by the processor. When executing the instruction, the processor implements the following: receiving an associated image uploaded by a client, where the associated image includes an image obtained when the client detects, based on an image recognition method, that a change of the goods occurs in a storage container; identifying information about the goods difference in the storage container based on the associated image; generating corresponding goods order change information by using the difference information; updating user order information corresponding to the client based on the goods order change information; and sending updated user order information to the client.

Notably, the previous server can further include another implementation method based on the descriptions of the method or apparatus implementations. For a specific implementation method, reference can be made to the descriptions in the related method implementations, and details are omitted here.

The server can include a separate server, or can include a server system composed of a plurality of servers, for example, a cloud server for storing user orders, a server for manual operation task scheduling, a server operated by a network cashier, a server for automatic video or image analysis, etc. or can be a distributed server or a server cluster architecture.

Notably, the previous apparatus or electronic device in the present specification can further include another implementation method based on the descriptions in the related method implementations. For a specific implementation method, reference can be made to the descriptions in the method implementations, and details are omitted here. The implementations in the present specification are described in a progressive way. For same or similar parts in the implementations, reference can be made to the implementations. Each implementation focuses on a difference from other implementations. Particularly, a hardware and program implementation is basically similar to a method implementation, and therefore is described briefly; for related parts, reference can be made to partial descriptions in the method implementations.

Certainly, based on the descriptions of the method or apparatus implementations on the client side, the present specification can further provide a shopping terminal. The shopping terminal can include the previous mobile phone with, for example, photographing and image data transmission functions, or can further include end-user devices such as a shopping cart and a positioning device. The client can include an image capture unit and a detection unit, and can be implemented by a processor executing a corresponding program instruction. For example, it can be implemented at a PC end by using the C++ language in a Windows operating system, or implemented by using a program design language in another system such as Linux, Android, or IOS, or implemented based on processing logic of a quantum computer. The shopping terminal can capture an image of a shopping cart and another storage container. When a consumer puts in or takes out goods, a change of the goods can be detected, and the captured image can be uploaded to the server, so that the server can identify goods in the image, to generate or process user order information and further implement rapid, highly-efficient, and reliable user goods order processing with low costs. The present specification provides a client. The client can include at least one processor and a memory configured to store an instruction executable by the processor. When executing the instruction, the processor implements the following: detecting, based on an image recognition method, whether a change of the goods occurs in a storage container; if a change of the goods is detected, sending an associated image of the change of the goods in the storage container to a server; receiving updated user order information returned by the server; and displaying the updated user order information.

Notably, the previous client can further include another implementation method based on the descriptions of the method or apparatus implementations. For a specific implementation method, reference can be made to the descriptions in the related method implementations, and details are omitted here.

Specific implementations of the present specification are described above. Other implementations fall within the scope of the appended claims. In some situations, the actions or steps described in the claims can be performed in a sequence different from the sequence in the implementation and the desired results can still be achieved. In addition, the process depicted in the accompanying drawings does not necessarily need a particular execution sequence to achieve the desired results. In some implementations, multi-tasking and parallel processing can be advantageous.

Figure 23:
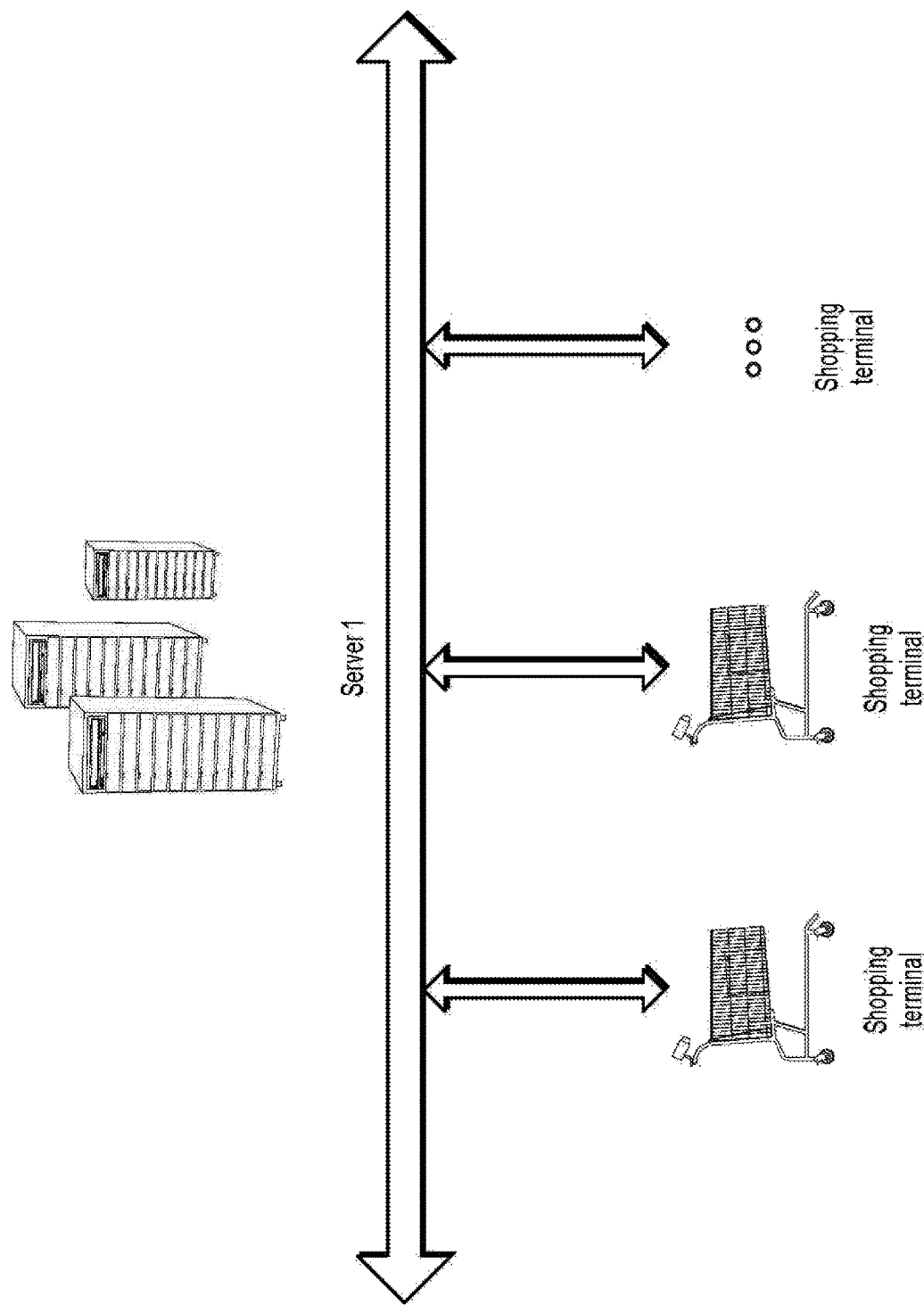
FIG. 23 is a schematic architectural diagram illustrating an implementation of a system, according to one implementation of the present specification.

Based on the descriptions of the method or the apparatus or the client or the server, the present specification further provides one or more goods order processing systems. FIG. 23 is a schematic architectural diagram illustrating an implementation of the system, according to one implementation of the present specification. The system can include shopping terminal 1 and server 2.

Server 1 can include the apparatus according to any of the implementations on the server side or can implement steps of any method on the server side.

Shopping terminal 2 can include the shopping terminal according to any one of the implementations or can implement steps of any one of the methods on the shopping terminal side.

According to the goods order processing method, apparatus, and system, the server, and the shopping terminal that are provided in one or more implementations of the present specification, a photographing device can be installed in a shopping basket, a shopping cart, or other storage containers, and a remote server can identify and determine a user order change by monitoring a change of the goods in the storage container in real time, and can generate or update a shopping list of a user. As such, end-user devices such as an intelligent shopping cart can be used to process data of self-service supermarket orders in combination with a server for goods identification and order processing to reduce self-service cashier devices, sensor devices, etc. With the implementation solutions provided in the present specification, an image capture device or a video shooting device of a client can be used to send image data of goods detection to a server, so that the server performs processes such as goods identification and order settlement. Therefore, overall hardware implementation costs can be lower. In addition, data exchanging nodes can be reduced and solution implementations can be simpler and more convenient. In actual applications, implementation costs of the technical solutions for automatic settlement processing of self-service supermarket goods orders can be greatly reduced, and the technical solutions are convenient to implement and have better stability. An implementation environment and implementation factors such as a self-service supermarket size, a customer flow volume, and a consumer behavior feature have relatively small impact, and facilitate large-scale promotion and use.

The content of the implementations of the present specification provides data description, storage, acquisition, interaction, calculation, determining, etc. of, for example, image capture and transmission by using a smartphone, detection model construction by using an RCNN method, cashier operation status setting for task allocation, and a plurality of processing methods upon an in-image-goods identification failure. However, the implementations of the present specification are not limited to satisfy an industry communications standard, a machine learning model, standard computer data processing and a data storage rule, or situations described in the one or more implementations of the present specification. A slightly modified implementation solution obtained by using some industry standards or a machine learning model, or in a self-defined way, or on a basis of the described implementations can also implement an implementation effect that is the same as, equivalent to, or similar to the described implementation, or an expected implementation effect obtained after transformation. The implementations of obtaining, storing, determining, processing, etc. of modified or deformed data can still fall within the scope of the optional implementation solutions of the implementations of the present specification.

Specific implementations of the present specification are described above. Other implementations fall within the scope of the appended claims. In some situations, the actions or steps described in the claims can be performed in a sequence different from the sequence in the implementation and the desired results can still be achieved. In addition, the process depicted in the accompanying drawings does not necessarily need a particular execution sequence to achieve the desired results. In some implementations, multi-tasking and parallel processing can be advantageous.

In the 1990s, whether a technology improvement is a hardware improvement (for example, an improvement of a circuit structure, such as a diode, a transistor, or a switch) or a software improvement (an improvement of a method procedure) can be obviously distinguished. However, as technologies develop, current improvements for many method procedures can be considered as direct improvements of hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce a dedicated integrated circuit chip. In addition, at present, instead of manually manufacturing an integrated circuit chip, such programming is mostly implemented by using "logic compiler" software. The logic compiler is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog2 are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate methods. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or an embedded microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the embedded microcontroller. Therefore, the controller can be considered as a hardware component, and an apparatus included in the controller and configured to implement various functions can also be considered as a structure in the hardware component. Or, the apparatus configured to implement various functions can even be considered as both a software module implementing the method and a structure in the hardware component.

The system, apparatus, module, or unit illustrated in the previous implementations can be implemented by using a computer chip or an entity, or can be implemented by using a product having a certain function. A typical implementation device is a computer. Specifically, the computer can be, for example, a personal computer, a laptop computer, a vehicle-mounted human computer interaction device, a cellular phone, a digital camera phone, a smartphone, a personal digital assistant, a media player, a navigation device, an email device, a game console, a tablet computer, or a wearable device, or a combination of any of these devices.

Although the one or more implementations of the present specification provide the operation steps of the method according to an implementation or a flowchart, the conventional or non-creative means can include more or fewer operation steps. The sequence of the steps listed in the implementations is merely one of numerous step execution sequences, and does not represent the unique execution sequence. In actual execution of an apparatus or a terminal product, execution can be performed based on a method sequence shown in the implementations or the accompanying drawings, or performed in parallel (for example, a parallel processor or a multi-threaded processing environment, or even a distributed data processing environment). The terms "include", "include", or their any other variant is intended to cover a non-exclusive inclusion, so that a process, a method, a product, or a device that includes a list of elements not only includes those elements but also includes other elements which are not expressly listed, or further includes elements inherent to such process, method, product, or device. An element preceded by "includes a . . . " does not, without more constraints, preclude the existence of additional identical elements in the process, method, product, or device that includes the element.

For ease of description, the previous apparatus is described by dividing the functions into various modules. Certainly, when the one or more implementations of the present specification are implemented, the functions of each module can be implemented in one or more pieces of software and/or hardware, or a module implementing a same function can be implemented by a combination of a plurality of submodules or subunits. The described apparatus implementation is merely an example. For example, the unit division is merely logical function division and can be other division in actual implementation. For example, a plurality of units or components can be combined or integrated into another system, or some features can be ignored or not performed. In addition, the displayed or discussed mutual couplings or direct couplings or communication connections can be implemented by using some interfaces. The indirect couplings or communication connections between the apparatuses or units can be implemented in electronic, mechanical, or other forms.

A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the embedded microcontroller. Therefore, the controller can be considered as a hardware component, and an apparatus included in the controller and configured to implement various functions can also be considered as a structure in the hardware component. Or, the apparatus configured to implement various functions can even be considered as both a software module implementing the method and a structure in the hardware component.

The present disclosure is described with reference to the flowcharts and/or block diagrams of the method, the device (system), and the computer program product according to the implementations of the present disclosure. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions can be stored in a computer readable memory that can instruct the computer or any other programmable data processing devices to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions can also be loaded onto a computer or another programmable data processing device, so that a series of operations and steps are performed on the computer or the another programmable device to generate computer-implemented processing. Therefore, the instructions executed on the computer or other programmable devices provide steps for implementing a specific function in one or more processes in the flowcharts and/or in one or more blocks in the block diagrams.

In a typical configuration, a computing device includes one or more processors (CPU), an input/output interface, a network interface, and a memory.

The memory can possibly include a non-persistent memory, a random access memory (RAM), a non-volatile memory, and/or another form in a computer readable medium, for example, a read-only memory (ROM) or a flash memory (flash RAM). The memory is an example of the computer readable medium.

The computer readable medium includes persistent, non-persistent, movable, and unmovable media that can implement information storage by using any method or technology. Information can be a computer readable instruction, a data structure, a program module, or other data. An example of a computer storage medium includes but is not limited to a phase change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a tape and disk storage, a graphene memory, or another magnetic storage device or any other non-transmission media that can be configured to store information that a computing device can access. Based on the description in the present specification, the computer readable medium does not include transitory computer-readable media (transitory media), for example, a modulated data signal and carrier.

A person skilled in the art should understand that the one or more implementations of the present specification can be provided as a method, a system, or a computer program product. Therefore, the one or more implementations of the present specification can use a form of hardware only implementations, software only implementations, or implementations with a combination of software and hardware. In addition, the one or more implementations of the present specification can use a form of a computer program product that is implemented on one or more computer-usable storage media (including but not limited to a disk memory, a CD-ROM, an optical memory, etc.) that include computer-usable program code.

The one or more implementations of the present specification can be described in common contexts of computer executable instructions executed by a computer, such as a program module. Generally, the program module includes a routine, a program, an object, a component, a data structure, etc. executing a specific task or implementing a specific abstract data type. The one or more implementations of the present specification can also be practiced in distributed computing environments. In these distributed computing environments, tasks are executed by remote processing devices that are connected by using a communications network. In a distributed computing environment, the program module can be located in both local and remote computer storage media including storage devices.

The implementations in the present specification are described in a progressive way. Same or similar parts in the implementations can reference to each other. Each implementation focuses on a difference from other implementations. Particularly, a system implementation is basically similar to a method implementation, and therefore, is described briefly. For related parts, reference can be made to related descriptions in the method implementation. In descriptions in the present specification, descriptions about such reference terms as "an implementation", "some implementations", "an example", "a specific example", and "some examples" mean that specific features, structures, materials, or characteristics described with reference to the implementations or examples are included in at least one implementation or example of the present specification. In the present specification, the previous example expressions of the terms are not necessarily with respect to a same implementation or example. In addition, the described specific features, structures, materials, or characteristics can be combined in a proper way in any one or more of the implementations or examples. In addition, a person skilled in the art can integrate or combine different implementations or examples and characteristics of different implementations or examples described in the present specification, provided that they do not conflict with each other.

The previous descriptions are merely implementations of the one or more implementations of the present specification, and are not intended to limit the one or more implementations of the present specification. For a person skilled in the art, the one or more implementations of the present specification can have various modifications and changes. Any modifications, equivalent replacements, improvements, etc. made within the spirit and principle of the present application shall fall within the protection scope of the claims.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for processing an order of goods, comprising:
receiving a notification of a user engaging a client device;

in response to receiving the notification, associating a user ID of the user with the client device;
receiving at least one associated image uploaded by the client device, wherein the at least one associated image is obtained in response to detecting, by the client device based on an image recognition method, an occurrence of a change of goods in a storage container;
identifying, based on the at least one associated image, difference information pertaining to a difference in the goods in the storage container;
in response to determining that a goods in the at least one associated image fails to be identified, generating an operation task for a detection failure of the at least one associated image, wherein the operation task comprises the user ID;
placing the operation task in a task scheduling queue;
retrieving the user ID from the operation task;
determining, from a plurality of network cashiers in a network cashier list, that a network cashier of the plurality of network cashiers is associated with the user ID;
in response to determining that the network cashier of the plurality of network cashiers is associated with the user ID, pushing the operation task in the task scheduling queue to a cashier node associated with the network cashier, wherein the network cashier list records task operation statuses of cashier nodes;
generating, using the difference information, corresponding goods order change information;
updating user order information corresponding to the client device based on the goods order change information; and
sending updated user order information to the client device.

2. The computer-implemented method according to claim 1, wherein the at least one associated image comprises at least one of the following images:
at least one first goods image corresponding to difference data that satisfies a change threshold;
at least one second goods image captured within a predetermined window corresponding to a moment of the change of the goods, the at least one second goods image being captured in response to detecting the occurrence of the change of the goods in the storage container; and
at least one third goods image captured in a predetermined time range corresponding to the moment of the change of the goods, the at least one third good image being captured in response to detecting the occurrence of the change of the goods in the storage container.

3. The computer-implemented method according to claim 1, wherein identifying the difference information pertaining to the difference in the goods in the storage container based on the at least one associated image comprises:
obtaining the at least one associated image; and
detecting goods information in the at least one associated image by using a goods detection model obtained through a machine learning algorithm, to determine the difference information.

4. The computer-implemented method according to claim 1, wherein identifying the difference information pertaining to the difference in the goods in the storage container based on the at least one associated image comprises:
detecting a goods identifier in the at least one associated image;
using the goods identifier as the difference information; and
in response to determining that the goods identifier in the at least one associated image fails to be identified, detecting goods information in the at least one associated image by using a goods detection model obtained through a machine learning algorithm to determine the difference information.

5. The computer-implemented method according to claim 1, comprising:
pushing the operation task to at least two cashier nodes, wherein identifying, based on the at least one associated image, the difference information pertaining to the difference in the goods in the storage container comprises:
determining the difference information pertaining to the difference in the goods in the storage container based on goods identification results of the at least two cashier nodes.

6. The computer-implemented method according to claim 1, further comprising:
in response to determining that a goods identification result of a cashier node comprises a goods identification failure, performing at least one of the following:
returning a prompt message to the client device, wherein the prompt message comprises information content of at least one of a goods order generation failure and a goods re-arrangement request; and
generating an unidentified-goods order corresponding to an associated image for the goods identification failure, and setting, based on information about the unidentified-goods order, an identity verification result of a storage container corresponding to the unidentified-goods order to "failed".

7. The computer-implemented method according to claim 1, further comprising:
receiving positioning information of the storage container uploaded by the client device;
determining a goods interval for the change of the goods in the storage container based on the positioning information of the storage container; and
wherein identifying the difference information pertaining to the difference in the goods in the storage container based on the at least one associated image comprises:
identifying goods information in the at least one associated image in a range of the goods interval; and
determining the difference information for the change of the goods in the storage container based on the goods information.

8. A non-transitory, computer-readable medium storing one or more instructions executable by a computer system to perform operations comprising:
receiving a notification of a user engaging a client device;
in response to receiving the notification, associating a user ID of the user with the client device;
receiving at least one associated image uploaded by the client device, wherein the at least one associated image is obtained in response to detecting, by the client device based on an image recognition method, an occurrence of a change of goods in a storage container;
identifying, based on the at least one associated image, difference information pertaining to a difference in the goods in the storage container;
in response to determining that a goods in the at least one associated image fails to be identified, generating an operation task for a detection failure of the at least one associated image, wherein the operation task comprises the user ID;
placing the operation task in a task scheduling queue;

retrieving the user ID from the operation task;
determining, from a plurality of network cashiers in a network cashier list, that a network cashier of the plurality of network cashiers is associated with the user ID;
in response to determining that the network cashier of the plurality of network cashiers is associated with the user ID, pushingthe operation task in the task scheduling queue to a cashier node associated with the network cashier, wherein the network cashier list records task operation statuses of cashier nodes;
generating, using the difference information, corresponding goods order change information;
updating user order information corresponding to the client device based on the goods order change information; and
sending updated user order information to the client device.

9. The non-transitory, computer-readable medium according to claim 8, wherein the at least one associated image comprises at least one of the following images:
at least one first goods image corresponding to difference data that satisfies a change threshold;
at least one second goods image captured within a predetermined window corresponding to a moment of the change of the goods, the at least one second goods image being captured in response to detecting the occurrence of the change of the goods in the storage container; and
at least one third goods image captured in a predetermined time range corresponding to the moment of the change of the goods, the at least one third good image being captured in response to detecting the occurrence of the change of the goods in the storage container.

10. The non-transitory, computer-readable medium according to claim 8, wherein identifying the difference information pertaining to the difference in the goods in the storage container based on the at least one associated image comprises:
obtaining the at least one associated image; and
detecting goods information in the at least one associated image by using a goods detection model obtained through a machine learning algorithm, to determine the difference information.

11. The non-transitory, computer-readable medium according to claim 8, wherein identifying the difference information pertaining to the difference in the goods in the storage container based on the at least one associated image comprises:
detecting a goods identifier in the at least one associated image;
using the goods identifier as the difference information; and
in response to determining that the goods identifier in the at least one associated image fails to be identified, detecting goods information in the at least one associated image by using a goods detection model obtained through a machine learning algorithm to determine the difference information.

12. The non-transitory, computer-readable medium according to claim 8, the operations comprising:
pushing the operation task to at least two cashier nodes; and
wherein identifying, based on the at least one associated image, the difference information pertaining to the difference in the goods in the storage container comprises:
determining the difference information pertaining to the difference in the goods in the storage container based on goods identification results of the at least two cashier nodes.

13. The non-transitory, computer-readable medium according to claim 8, the operations comprising:
in response to determining that a goods identification result of a cashier node comprises a goods identification failure, performing at least one of the following:
returning a prompt message to the client device, wherein the prompt message comprises information content of at least one of a goods order generation failure and a goods re-arrangement request; and
generating an unidentified-goods order corresponding to an associated image for the goods identification failure, and setting, based on information about the unidentified-goods order, an identity verification result of a storage container corresponding to the unidentified-goods order to "failed".

14. The non-transitory, computer-readable medium according to claim 8, the operations comprising:
receiving positioning information of the storage container uploaded by the client device;
determining a goods interval for the change of the goods in the storage container based on the positioning information of the storage container; and
wherein identifying the difference information pertaining to the difference in the goods in the storage container based on the at least one associated image comprises:
identifying goods information in the at least one associated image in a range of the goods interval; and
determining the difference information for the change of the goods in the storage container based on the goods information.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving a notification of a user engaging a client device;
in response to receiving the notification, associating a user ID of the user with the client device;
receiving at least one associated image uploaded by the client device, wherein the at least one associated image is obtained in response to detecting, by the client device based on an image recognition method, an occurrence of a change of goods in a storage container;
identifying, based on the at least one associated image, difference information pertaining to a difference in the goods in the storage container;
in response to determining that a goods in the at least one associated image fails to be identified, generating an operation task for a detection failure of the at least one associated image, wherein the operation task comprises the user ID;
placing the operation task in a task scheduling queue;
retrieving the user ID from the operation task;
determining, from a plurality of network cashiers in a network cashier list, that a network cashier of the plurality of network cashiers is associated with the user ID;

in response to determining that the network cashier of the plurality of network cashiers is associated with the user ID, pushing the operation task in the task scheduling queue to a cashier node associated with the network cashier, wherein the network cashier list records task operation statuses of cashier nodes;

generating, using the difference information, corresponding goods order change information;

updating user order information corresponding to the client device based on the goods order change information; and sending updated user order information to the client device.

16. The computer-implemented system according to claim 15, wherein the at least one associated image comprises at least one of the following images:

at least one first goods image corresponding to difference data that satisfies a change threshold;

at least one second goods image captured within a predetermined window corresponding to a moment of the change of the goods, the at least one second goods image being captured in response to detecting the occurrence of the change of the goods in the storage container; and at least one third goods image captured in a predetermined time range corresponding to the moment of the change of the goods, the at least one third good image being captured in response to detecting the occurrence of the change of the goods in the storage container.

17. The computer-implemented system according to claim 15, wherein identifying the difference information pertaining to the difference in the goods in the storage container based on the at least one associated image comprises:

obtaining the at least one associated image; and detecting goods information in the at least one associated image by using a goods detection model obtained through a machine learning algorithm, to determine the difference information.

18. The computer-implemented system according to claim 15, wherein identifying the difference information pertaining to the difference in the goods in the storage container based on the at least one associated image comprises:

detecting a goods identifier in the at least one associated image;

using the goods identifier as the difference information; and in response to determining that the goods identifier in the at least one associated image fails to be identified, detecting goods information in the at least one associated image by using a goods detection model obtained through a machine learning algorithm to determine the difference information.

19. The computer-implemented system according to claim 15, the operations comprising:

pushing the operation task to at least two cashier nodes; and wherein identifying, based on the at least one associated image, the difference information pertaining to the difference in the goods in the storage container comprises:

determining the difference information pertaining to the difference in the goods in the storage container based on goods identification results of the at least two cashier nodes.

20. The computer-implemented system according to claim 15, the operations further comprising:

in response to determining that a goods identification result of a cashier node comprises a goods identification failure, performing at least one of the following:

returning a prompt message to the client device, wherein the prompt message comprises information content of at least one of a goods order generation failure and a goods re-arrangement request; and generating an unidentified-goods order corresponding to an associated image for the goods identification failure, and setting, based on information about the unidentified-goods order, an identity verification result of a storage container corresponding to the unidentified-goods order to "failed".

* * * * *

UNITED STATES PATENT AND TRADEMARK OFFICE
CERTIFICATE OF CORRECTION

| | |
|---|---|
| PATENT NO. | : 11,019,180 B2 |
| APPLICATION NO. | : 16/945650 |
| DATED | : May 25, 2021 |
| INVENTOR(S) | : Hong Zhang and Xiaodong Zeng |

It is certified that error appears in the above-identified patent and that said Letters Patent is hereby corrected as shown below:

In the Claims

Column 39/Line 8 – In Claim 8, delete "pushingthe" and insert -- pushing the --, therefor.

Signed and Sealed this
Third Day of May, 2022

Katherine Kelly Vidal
*Director of the United States Patent and Trademark Office*